US010977708B2

(12) United States Patent
Goens et al.

(10) Patent No.: US 10,977,708 B2
(45) Date of Patent: *Apr. 13, 2021

(54) PRODUCT CLARITY SCORE AND CHANNEL TAGGING

(71) Applicant: CLYR, LLC, Carmel, IN (US)

(72) Inventors: Jeffrey S. Goens, Carmel, IN (US); Brenda Schmidt, Fishers, IN (US)

(73) Assignee: CLYR, LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,351

(22) Filed: Jun. 8, 2020

(65) Prior Publication Data

US 2020/0302504 A1    Sep. 24, 2020

Related U.S. Application Data

(63) Continuation-in-part of application No. 15/422,987, filed on Feb. 2, 2017, now Pat. No. 10,679,273.

(60) Provisional application No. 62/290,291, filed on Feb. 2, 2016.

(51) Int. Cl.
*G06Q 30/00* (2012.01)
*G06Q 30/06* (2012.01)
*G06Q 30/02* (2012.01)

(52) U.S. Cl.
CPC ....... *G06Q 30/0627* (2013.01); *G06Q 30/018* (2013.01); *G06Q 30/0282* (2013.01)

(58) Field of Classification Search
None
See application file for complete search history.

(56) References Cited

U.S. PATENT DOCUMENTS

| 6,375,077 | B1 | 4/2002 | Hankins |
| 10,679,273 | B2 | 6/2020 | Goens et al. |
| 2009/0198596 | A1 | 8/2009 | Dolan et al. |
| 2010/0003647 | A1 | 1/2010 | Brown et al. |
| 2012/0316960 | A1 | 12/2012 | Yang |
| 2017/0177725 | A1* | 6/2017 | High .................. G06F 16/951 |
| 2017/0228742 | A1 | 8/2017 | Aljawhari |

* cited by examiner

*Primary Examiner* — Mila Airapetian
(74) *Attorney, Agent, or Firm* — Frost Brown Todd LLC

(57) ABSTRACT

A system provides consumers more product information to make informed buying decisions as well as recommendations, promotional messages, or couponing associated with a selected or related product. When used in a retail environment, radio or visual tagging of the products, displays, or retail shelf allows a mobile or other computing device to read a unique identifier and use it to retrieve the product information from a remote server. An extended clarity score may combine objective data and/or qualitative, subjective data with information about whether certain data has been provided. In some embodiments, structured identifiers indicate particular sources, product lines, production batches, marketing channels, retail destinations, and the like. In others, the information is retrieved as a function of one or a combination of products that the consumer has considered during a single in-store shopping trip.

20 Claims, 15 Drawing Sheets

PRODUCT CLARITY SCORE AND CHANNEL TAGGING

REFERENCE TO RELATED APPLICATIONS

This is a continuation-in-part of non-provisional application Ser. No. 15/422,987, filed Feb. 2, 2017, which itself claims priority to provisional application Ser. No. 62/290,291, filed Feb. 2, 2016, the disclosure of each of which is incorporated herein by reference.

FIELD

The disclosed technology pertains to the field of processing data by operating upon the order or content of the data handled, particularly, arrangements for selecting data on individual record carriers and providing upsell, cross-sell, and promotional messaging to an end user.

BACKGROUND

Historically, descriptors such as "low-fat," "fat-free," "sugar-fee," "whole wheat," "paraben free," and "no MSG" have all been associated with and used to describe products for health and marketing reasons. However, over the last several years there has been a strong push by consumers to obtain more detailed information about the products they are interested in purchasing, and many choose which product to purchase based upon various criteria or classifications beyond the traditional high-level indicators of macronutrients or other ingredients in food. As a result, whether in a grocery store or a niche restaurant, consumers will now commonly see products described as vegan, organic, vegetarian, gluten-free, locally sourced, antibiotic-free, hydroponically grown, free-range, foraged, all-natural, and no preservatives, just to name a few; however, this information is not uniformly provided for all products.

The variety and nature of these descriptors creates various dynamics between consumers and producers. Some consumers may, for health, religious, or philosophical reasons, seek out products fitting certain criteria. At the same time, other consumers may be distrustful of such descriptors and see them as an attempt by a producer to inflate the price of a product, falsely suggest characteristics that their product does not actually have, assign a characteristic to a product by adhering to a misleading third-party standard or grading system, or all of the above. Even where a consumer does not suspect a supplier of intentionally misleading, the chain of parties who each touch a product as it moves from a point of creation to a store shelf is so great that a variety of mistakes, miscommunications, or technical errors could result in products being mislabeled or misidentified as having certain characteristics.

This combination of consumers having a desire to purchase products with certain characteristics and suppliers being incentivized to associate their products with those characteristics, as well as a market where there may not be strict oversight of such associations, leads to friction and distrust between consumer and supplier. This friction may manifest itself as a hesitancy by the consumer to buy products while at a retail store if the messaging and descriptions associated with the product are unclear or lack credibility, and a resistance by the supplier to providing more information to a consumer than is required by law.

What is needed, therefore, is an improved system for providing product, related product, or cross-promotional information to consumers.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of product information aggregation, access, tracking, and display. While the disclosed applications of the inventors' technology satisfy a long-felt but unmet need in the art, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only and should not be treated as limiting.

I. Exemplary System for Managing Product Information

Figure 1:
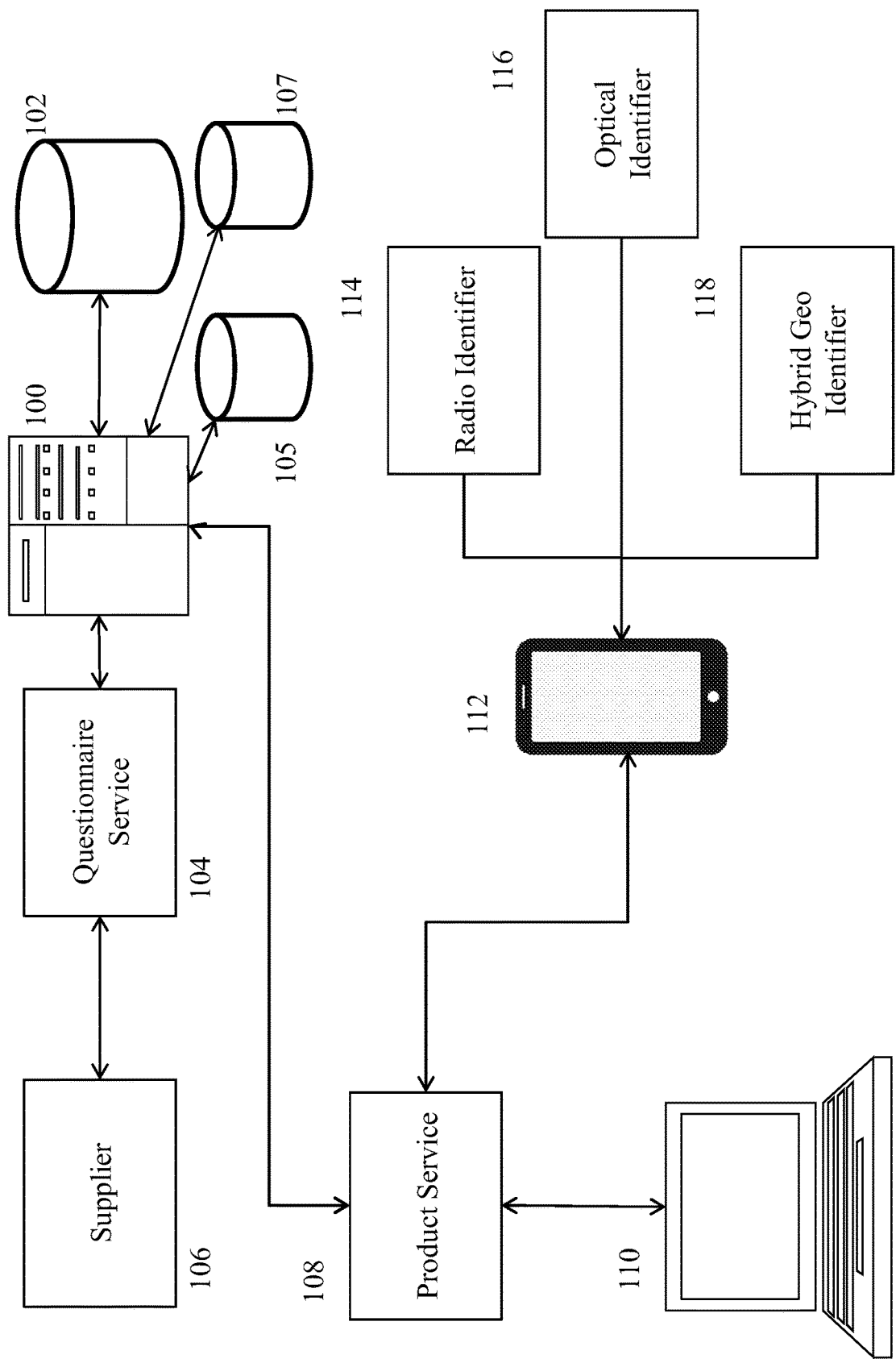
FIG. 1 is a schematic diagram of an exemplary system configured to receive product information from a supplier and make it available to a consumer.

Turning now to the figures, FIG. 1 shows a schematic diagram of an exemplary system configured to receive product information from a retail channel participant, including but not limited to a manufacturer, retailer, distributor, food producer, direct store sales entity, direct store delivery entity, or wholesaler (generically called a "supplier" herein), (106) and make it available to a consumer. A server (100) is configured to execute a number of software processes to host a questionnaire service (104) and a product service (108). The server may be one or more physical servers, virtual servers, cloud servers, or other similar environments that can send, receive, store, and manipulate information. The server (100) is in communication with a database (102), which is configured to provide long- and short-term storage of information available to the server (100). As with the server (100), the database (102) may include one or more of physical disks, virtual disks, cloud storage, or the like, and may be organized as a relational database, object oriented database, flat file database, or other organizational method allowing for data to be stored and accessed programmatically. The questionnaire service (104) and product service (108) may each include one or more of a web service, application programming interface, website, third-party product information database or service, data appending service, mobile application, desktop application, or other similar platform for exposing, sending, and receiving information over a network.

In the illustrated embodiment, the questionnaire service (104) is made available and accessible to suppliers (106) of food and goods. Suppliers (106) accessing the questionnaire service (104) may provide information on food and goods they create, supply, produce, sell, market, stock, or resell in response to questions or prompts relating to the good. This could include, for example, where the questionnaire service (104) is a website, and a supplier (106) may log in to the website, identify a particular product they would like to provide information on, view one or more questions, queries, or prompts relating to the product via a user interface of the website, and provide responses such as selection of checkboxes or radio buttons, typing of information, providing URL links, and uploading images or other files. Information received via the questionnaire service (104) may be manipulated and stored on one or more of the server (100) and database (102). In some embodiments, basic information for a product or group of products is provided by a product information service (105) and may be supplemented by data appending service (107) either before or after data about that product or group is entered or modified.

Continuing the above example, a supplier (106) of apples may access the questionnaire service (104) as a website, which may display a question about whether pesticides are used on the apples they supply. The apple supplier may respond, for example, by interacting with an interface element to indicate a "yes" answer, may provide additional typed information to indicate that the pesticide used is certified safe, and may upload an image of a document to serve as evidence that the pesticide is certified as safe. The questionnaire service (104) website receives the information provided, which may be held by the server (100) for additional processing, as well as being saved to the database (102) for long-term storage. While not ideal, the questionnaire service (104) could also include an interface for entering data collected via a printed questionnaire that suppliers may complete and return to the operator of questionnaire service (104) via upload, facsimile transmission, or courier service. In other alternative embodiments, information is provided to questionnaire service (104) through an in-person or telephonic interview with the supplier, mobile app, or other means as will occur to those skilled in the art. In some embodiments, typical answers for a product category are supplied for some questions as the questionnaire is presented, and the supplier can simply confirm those default answers rather than select them with no baseline comparative information.

In some embodiments that include profiles of food products, the questionnaire service (104) also collects nutritional and ingredient information and stores it as part of the product profile. When the profile is displayed, the nutritional and ingredient information might be selectively displayable on a per-serving, per-mass (for example, per-100 g), per-package, or another basis as will occur to those skilled in the art. In other embodiments, "Comprehensive Clarity Information" (CCI) combining a clarity score (see below) with additional information including but not limited to applicable ones of ingredients, components, materials, metrics, quantifiable characteristics, product claims, coupons, cross-selling and/or upselling suggestions, promotional information, environmental impact, origin, dietary, and nutritional data regarding the given product or related products is stored and selectively displayed with the product profile and is used in composite scores, badges, ratings, and the like.

The product service (108) is made available and accessible to consumer users via, for example, a home device (110) or mobile device (112). A home device (110) may be a computer, laptop, tablet, smart device, or other computing device that is generally used from the user's home, during a commute, or in other settings where the user may or may not be in physical proximity to particular products of interest. A mobile device (112) may be a mobile phone, tablet, smart device, or other generally mobile computing device that a user may use at a retail location while in physical proximity to products of interest. A home device (110) and mobile device (112) may be similar or even identical devices in some instances, with the distinction being the actual and intended use, user interface, and available features. A home device (110) may access the product service (108) by, for example, accessing a website via a web browser, executing a software application, or accessing a web service or application programming interface to send and receive information as described in more detail herein. For example, one home device (110) may be a laptop used by a consumer to access the product service (108) via a website. The product service (108) website displays information and interface elements to the consumer user and allows the user to search and select products they want to receive information on or to add them to one or more shopping or saving lists. The product service (108) website, in response to a selection, may retrieve product information from the server (100), database (102), or both, and may display the information to the consumer user via an interface of the product service (108) website.

A mobile device (112) may access the product service (108) by, for example, a website via a web browser, a mobile application, or another interface for sending and receiving information. For example, one mobile device (112) may be a smart phone used by a consumer to access the product service (108) via a mobile application installed and configured on the mobile device (112). In some embodiments, the mobile application prompts a user to interact with a product at a retail location in order to gain more information on the product. This interaction may occur in a variety of ways, and may include, for example, a radio transceiver of the mobile device receiving information from a radio identifier (114) that has been placed on or proximately to the product. This could include a data transaction by any of a variety of radio frequency identification (RFID), near field communication (NFC), or similar short-range communication devices and methods as will occur to those skilled in the art. For example, an NFC tag embedded in a sticker (114) may be placed on a product, integrated in a sticker (114) on a ferrous or ferritic backing on its shipping box, built into its point-of-sale materials, or presented in other locations as will occur to those skilled in the art.

When the mobile device (112) is placed in proximity to the radio identifier (114), a data transaction occurs, and the mobile device (112) receives a URL that comprises a unique identifier for the product, and mobile device (112) passes the unique identifier via the product service (108) to the server (100) by accessing the URL. The server may access the database (102) or a local storage device and use the unique identifier to identify the supplier (106) and the product profile associated with that batch of apples. Once identified, server (100) retrieves the corresponding product profile, transmits it to the mobile device (112) via the product service (108), and displays it on the mobile device (112). In this manner, the user of the mobile device (112) may interact with the radio identifier (114) and in a short period of time see additional product profile information on the apple that is not ordinarily available at the retail location. Note that, while many URLs will use HTTP(S), perhaps using local (LAN) or publicly available (WAN) data connections, in other embodiments the information stored on a given tag and the various users' communications with server (100) and database (102) will use other protocols and other topologies as will occur to those of ordinary skill in the art in view of this disclosure.

As will occur to those of ordinary skill in the art in view of this disclosure, obtaining a unique identifier for a given product may be accomplished in additional ways besides placement of a radio identifier (114) on the product itself. For example, the radio identifier (114) or other computer-readable label might be placed on packaging of an individual product or on a display visible to shoppers in a retail store. In another example, an optical identifier (116) may be scanned by an optical capturing component of a mobile device (112) to obtain a unique identifier. In various embodiments, this includes a barcode on product packaging being scanned to read a SKU, a QR code on an on-shelf display being scanned to read a unique generated identifier, or even an image of the product box or packaging being captured and used to compare against a library of product packaging samples. In each case, after the unique optical identifier (116) information is captured by the imaging component of the mobile device (112), it is transmitted via the product service (108), such as a mobile application or website, to the server (100), which will use the unique identifier to access the product profile and return it to the mobile device (112). Unique identifiers originating from a barcode, QR code, or other data-encoded optical, magnetic, or wireless identifier may key typical information retrieval means such as a database query. Unique identifiers originating from a product's packaging or image may be compared against a library of product packaging images using known image comparison means in order to ideally identify the intended product and retrieve the associated product profile.

Another example of gaining a unique product identifier is by way of a hybrid geo identifier (118). This may be especially useful for products such as apples or other produce where a true barcode is not often already present on the product and instead a non-unique price lookup code, or PLU is used, such as a four-digit produce identifier. It may also provide information from which suppliers can correlate the shopper's activities during a single shopping trip and across multiple trips. While a four-digit produce identifier may not uniquely identify a product and supplier, the combination of a four-digit produce identifier and geographic coordinates from a global positioning component of the mobile device (112), or appended data (such as a URL component) based on—or even added by a router, proxy server, or other device involved with—the local-area connection of mobile device (112), may be enough to create a hybrid geo identifier (118). For example, a code for banana may be 4011, which many stores may use, so identifying a supplier (106) based only upon the code 4011 is not possible. However, the code 4011, indicating banana, in combination with GPS coordinates or local-area connection information indicating that the user is concerned with a banana in a particular retail location at a particular date and time may together be used by the server (100) to identify suppliers (106) who have provided product profile information indicating that they have supplied bananas to the retail location matching the received GPS coordinate. Alternatively or additionally, retail locations such as grocery stores will in some embodiments provide data regarding suppliers who have provided goods or particular classes of goods to that location (or particular locations) for sale on certain dates. In these cases data from all available sources may be correlated to determine the product profile(s) that match the consumer's query. Once this has occurred, the product profile(s) and CCI that has been identified may be provided via the product service (108) to the mobile device (112).

Figure 9:
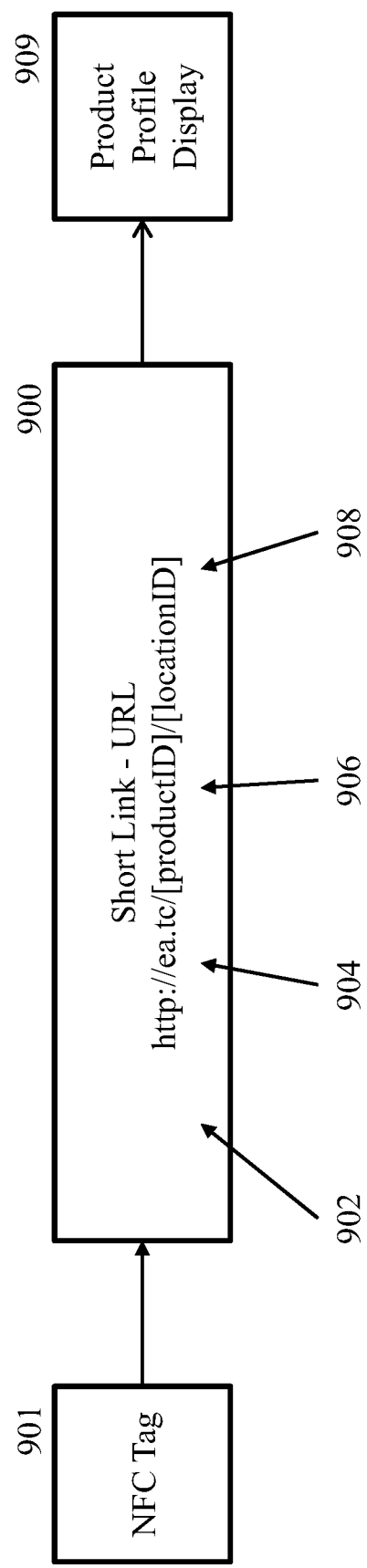
FIG. 9 is an illustration of a segmented URL for use in the system of FIG. 1.

In some embodiments, as shown in FIG. 9, the URL (900) that contains the product identifier is segmented into a scheme (902), domain (904), product identifier (906), and location identifier (908). In some embodiments, the scheme (902) is a generic scheme for retrieving information, such as HTTP or HTPPS, while others use a specialized scheme that is defined by a particular provider or consortium and is understood by specialized software and systems. In some embodiments, the domain (904) is defined in the global DNS system, while other embodiments use different domains, servers, or data delivery methodologies for different repositories, market segments, or other purposes as will occur to those skilled in the art.

The product identifier segment (906) of the URL (900) is a product identification code defined by the system operator, a government agency, an industry consortium, the supplier, or another person or entity as will occur to those skilled in the art. In some embodiments, the information carried by the product identifier segment (906) is unique to a particular version of a particular product with a particular formulation that is manufactured at a particular location, while in other embodiments, the specification is less granular, and the product identifier segment (906) does not include some of this information. In still other embodiments, even more granularity is used, so that a given product identifier relates to a specific product batch. In these embodiments, consumer users are able to use the system to check whether a specific product unit is part of a recall, for example. And as will occur to those skilled in the art, the structure of product identifier segment (906) might take any of a variety of forms in various embodiments, such as part of the path in URL (900), encoded query parameters, and included or encoded UPC, or other form.

The location identifier segment (908) in the illustrated embodiment encodes the channel and/or location where URL (900) is being placed. For example, URL (900) might be printed and/or encoded in a magazine advertisement with a location identifier specific to that ad. Other location identifiers specify the retailer through whom the product is being sold, the marketing campaign being applied to the channel in which the product is being sold, some other code relevant to supply chain, distribution chain, or marketing tracking, or nothing at all.

In any of these embodiments, the product identifier (906) and location identifier (908) may simply be included as parts of the URL (900) as illustrated in FIG. 9. In other embodiments, one or both of those identifiers, or the combination thereof, is encoded using Base64, BinHex, yEnc, UUencoding, or other encoding technique as will occur to those skilled in the art. In some such embodiments, the data is also encrypted and/or subjected to authentication techniques or integrity checks as will also occur to those skilled in the art. In varying embodiments, the URL (900) is usable to access and display (800, 909) the product profile, as will be apparent to those of ordinary skill in the art in light of this disclosure.

II. Exemplary Method for Providing Product Clarity Score

Figure 2:
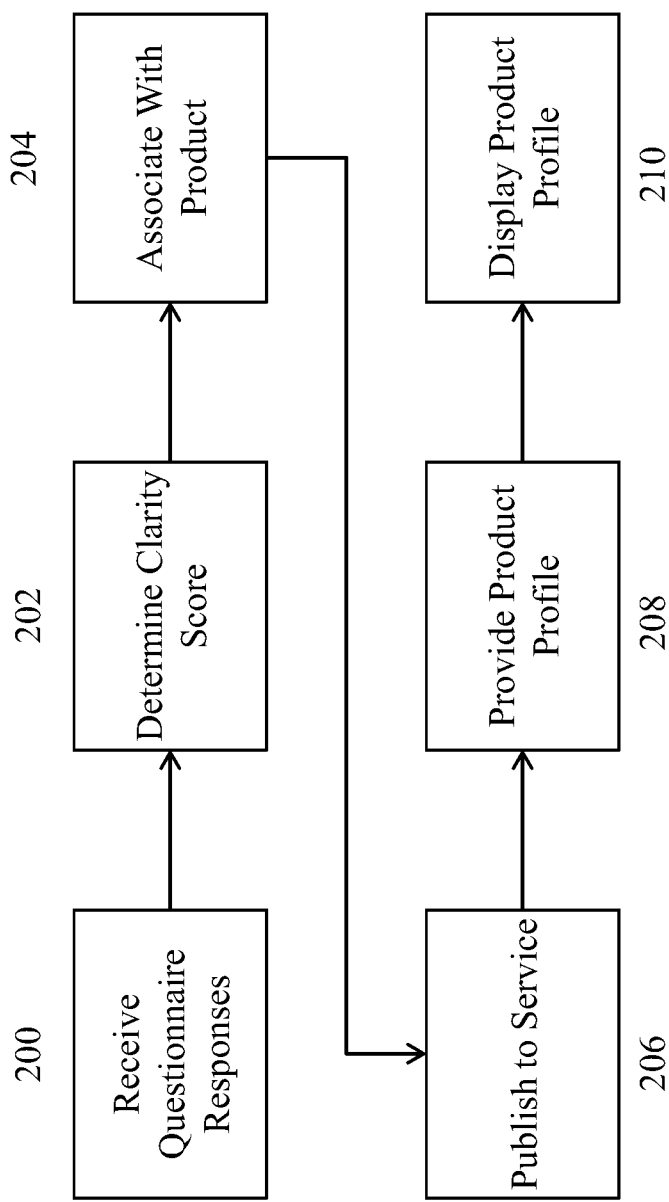
FIG. 2 is a flowchart of a set of high-level steps for receiving product information from a supplier and make it available to a consumer in the system of FIG. 1.

Turning now to FIG. 2, that figure shows a flowchart of high-level steps that a system could perform to receive product information from a supplier and make it available to a consumer. Questionnaire responses are received (200) via the questionnaire service (104), the responses providing a variety of information on one or more products that the responder supplies to the supply chain and/or retail locations. A service provider or third party in some cases validates or authenticates these responses. In some embodiments, a "clarity score" (defined herein as an alphabetical, numerical, or other grade determined at least in part on the amount and/or quality of information about a product that is available, rather than on the information itself) is determined (202) for each distinct product or class of products for which information has been provided by the supplier (106). In other embodiments, a clarity score is calculated periodically based on then-current information and/or dynamically by the database (102), server (100), or client (110, 112) upon retrieval of the product/class profile. This clarity score does not indicate that the product exhibits any singular characteristic, such as being vegan or gluten-free, but instead measures the extent to which the supplier (106) of the product provided complete information in response to the questionnaire for the product, and in some cases may also account for the credibility or verifiability of one or more responses provided for the product. Additional composite ratings, scores, badges, and the like are calculated in some embodiments for display in one or more contexts related to the system, as will occur to those of ordinary skill in the art in view of this disclosure. As one example, a particular badge is associated with a product when a certain subset of questions from questionnaire service (104) are not just answered by the supplier (106) but answered in a particular way.

After determining (202) a clarity score, the clarity score and other product profile information gathered via the questionnaire or other sources is associated with the product (204) by documenting one or more links between the product itself and the data stored on the server (100) and in database (102). Creation of those links may be by placing a radio identifier tag (114) on the product and configuring the database (102) to associate all or part of that radio identifier with the product profile for that product, by creating or identifying an optical identifier (116) for the product and corresponding association in the database with the product profile, or by configuring a hybrid geo identifier (118) and associating it in the database with the product profile. Once a product profile has been associated with a product, the product information may be published (206) to one or more services, making the product profile available to users. When requested by a user, the product profile may then be provided (208) to the user and displayed (210) to the user in various configurations.

Figure 3:
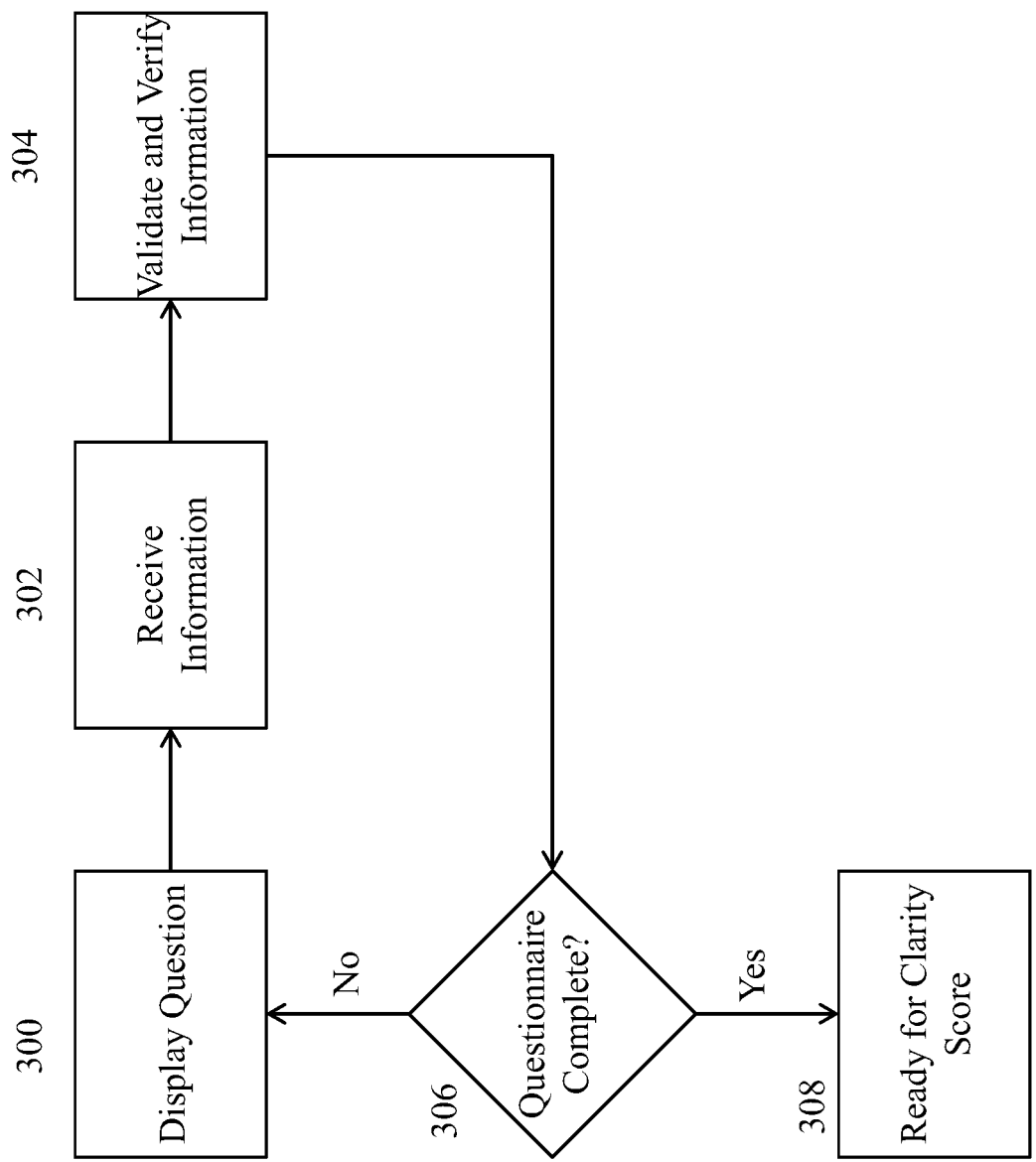
FIG. 3 is a flowchart of a set of steps for receiving product information from a supplier in the system of FIG. 1.

Turning now to FIG. 3, we see a flowchart of a set of steps that a system could perform to receive product information from a supplier. As discussed above, a supplier (106) may access a questionnaire service (104) via a website or other interface. Once the supplier (106) has accessed the service and provided necessary information to authenticate or validate their status as a supplier of certain products or other authorized data provider, the supplier (106) may either create a new product profile entry or choose from a list of partial or full product profile entries that have been pre-configured or otherwise stored in or accessible to the system, such as by way of product information service (105), perhaps supplemented by data appending service (107). Once a new product profile has been started, one or more questions may be displayed via an interface of the questionnaire service (104). These questions will be designed to gather information on the product and may vary by product type. For example, if a product is selected that is configured as produce, questions may include where the produce was grown, what chemicals were used on it, how it was transported, whether it is certified as organic, nutritional information, any additives used, whether it ever contacted nuts or other potential allergens (or equipment also used to process them), and similar questions as may be apparent to one of ordinary skill in the art. If a product is selected that is configured as a boxed good, questions may instead focus on ingredients, origins of ingredients, packaging materials, packaging location, date of packaging, expiration date, and other similar questions as will occur to one of ordinary skill in the art.

As questions are displayed (300) and the supplier provides answers, the server (100) receives (302) the answer information via the questionnaire service (104). Answers may be a simple yes or no, a selection from a pre-populated list such as identifying a state of origin for a product, a typed string describing how the product is transported, uploading or providing a file, or a simple indication that the supplier (106) does not know the answer, does not have the information, or does not wish to answer the question. In some embodiments, the server (100) validates and verifies the input information (304). For example, if an apple supplier answers a question indicating that their apples are certified organic by a local organic growers' association, the server (100) may attempt to automatically validate such a certification by using a software interface or application programming interface provided by that organic growers' association. Alternately, an administrator or internal user of the server (100) may contact such an association and manually verify the provided information, then indicate to the system when and how it has been validated. As another example, a supplier (106) may indicate that they grow organic apples and provide an image of a certification record or document. Image recognition software run by the server (100) may be used to validate the basic structure of this document as authentic. Validation and verification (304) is of course not possible for each answer, but when possible may add additional credibility and value to the response. Questions may be displayed (300) individually, a page at a time, collectively in a long scrolling list, or grouped by similarities. As questions are displayed (300) and responses are received (302), the system will continue to gather information until the questionnaire is complete (306). In some embodiments, the system modifies its presentation of questions based on answers that came before. For example, if a supplier (106) says that particular product is compatible with a vegan diet, the system might skip the questions in the questionnaire about treatment of animals. In other embodiments, the system responds to a "vegan-compatible" indications by pre-filling obvious answers to (but still presenting to the supplier) such apparently irrelevant questions. Once all the questions have been posed and whatever responses the supplier provided have been received, the results of the questionnaire may be committed to one or more of the server (100) and database (102), and may also be sent to a process configured to determine the clarity score (308).

Figure 4:
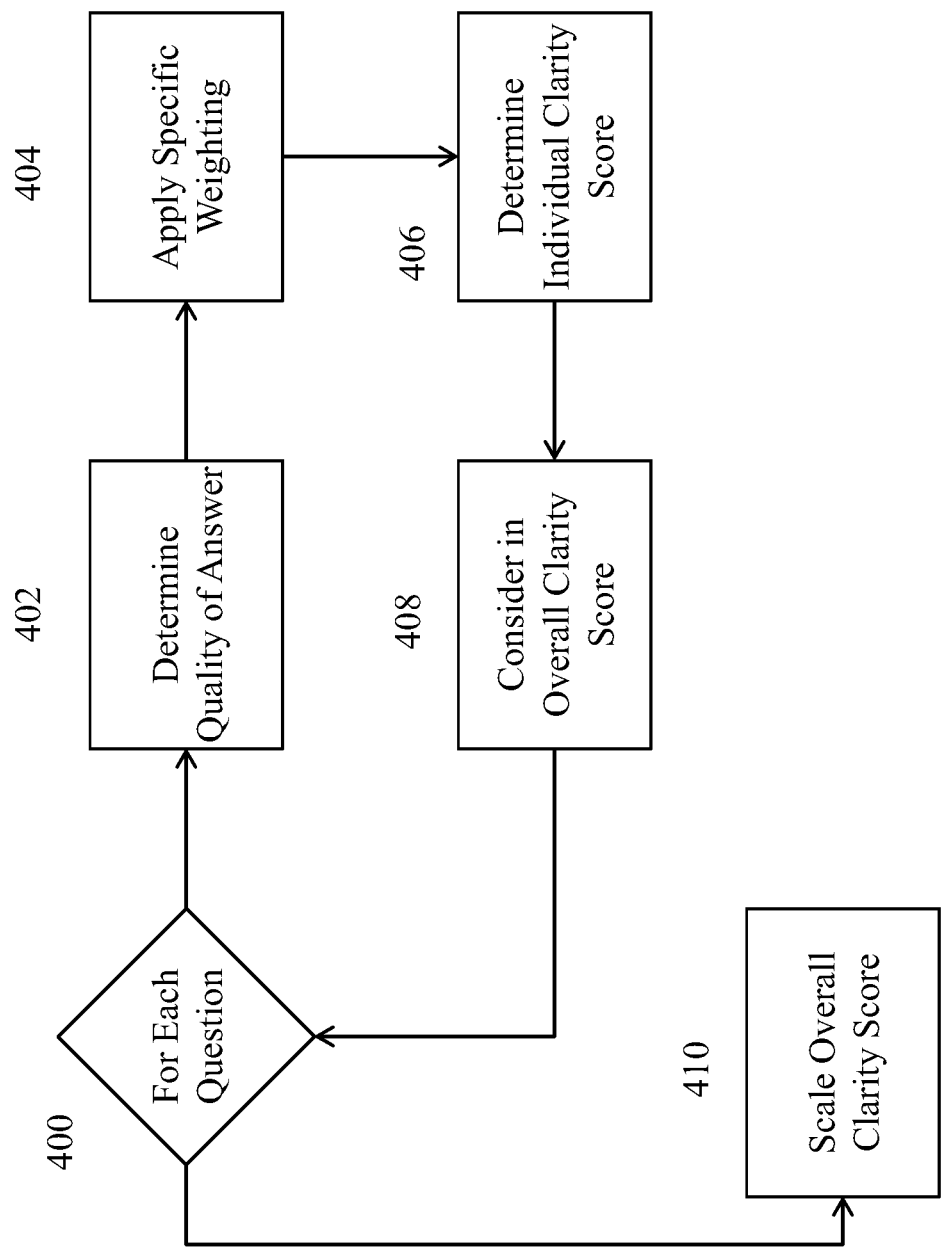
FIG. 4 is a flowchart of a set of steps for determining a clarity score based upon product information in the system of FIG. 1.

Turning now to FIG. 4, that figure shows a flowchart of a set of steps that a system could perform to determine a clarity score based upon received product information. The particular steps, configurations, values, and calculations used to determine a clarity score for a product profile may vary by embodiment, and as such, FIG. 4 shows only one exemplary embodiment. However, each embodiment will have in common that the suppliers' (106) interactions with or responses to the questionnaire will be used to determine a quantitative clarity rating for a particular product. In the illustrated embodiment, for each question that is part of the questionnaire posed for a particular product (400), the system will first determine the quality of the answer (402). In some embodiments, the score will depend only on the presence or absence of an answer. In other embodiments, this quality determination could include assigning a value of 0 to not providing an answer or skipping the question entirely, a value of 1 for indicating that the requested information is not known, a value of 4 for providing a brief response such as an indication of yes, no, or a written description, a value of 6 for providing uploaded images or documents verifying the response, and so on.

A question-specific weighting may then be applied (404) to determine an individual clarity score (406) for that particular question and that particular type of product. A question- or topic-specific weighting may be configured at the time the question is configured in order to give more weight to questions and topics that consumers find important. For example, a question regarding the product's state of origin may have a multiplicative weight of 1, so that a brief response with a value of 4 indicating the state of origin results in a weighted value of 4. A question on country of origin may have a multiplicative weight of 5, so that a brief response with a value of 4 indicating the state of origin results in a weighted value of 20. Allowing for an initial answer value as well as a question or topic specific weighting allows a system administrator to have great flexibility in configuring the system to provide consumers with a meaningful clarity score.

Once the individual clarity score has been determined (406), the individual clarity score may be marked to be considered in the overall clarity score (408) for the product, which may be some aggregate or function of the individual clarity scores. This process may repeat for each question (400) that was part of the questionnaire, and once an individual clarity score has been determined (406) for each question, the aggregated overall clarity score may be scaled and determined (410). This may simply be an additive score of each individual clarity score, so that for a questionnaire with one hundred questions, the overall clarity score could be between 0 and 1000 depending upon the weightings used, or it may be scaled to a more familiar rating scale, such as a 0 to 100 scale, a graded letter scale of A through F, a color-coded scale or spectrum, or other similar scaled values that may indicate to a consumer the extent to which the supplier provided meaningful responses to the questionnaire. This overall clarity score (410) may then be made part of the product profile, which already contains all the information gathered on the product.

Figure 5:
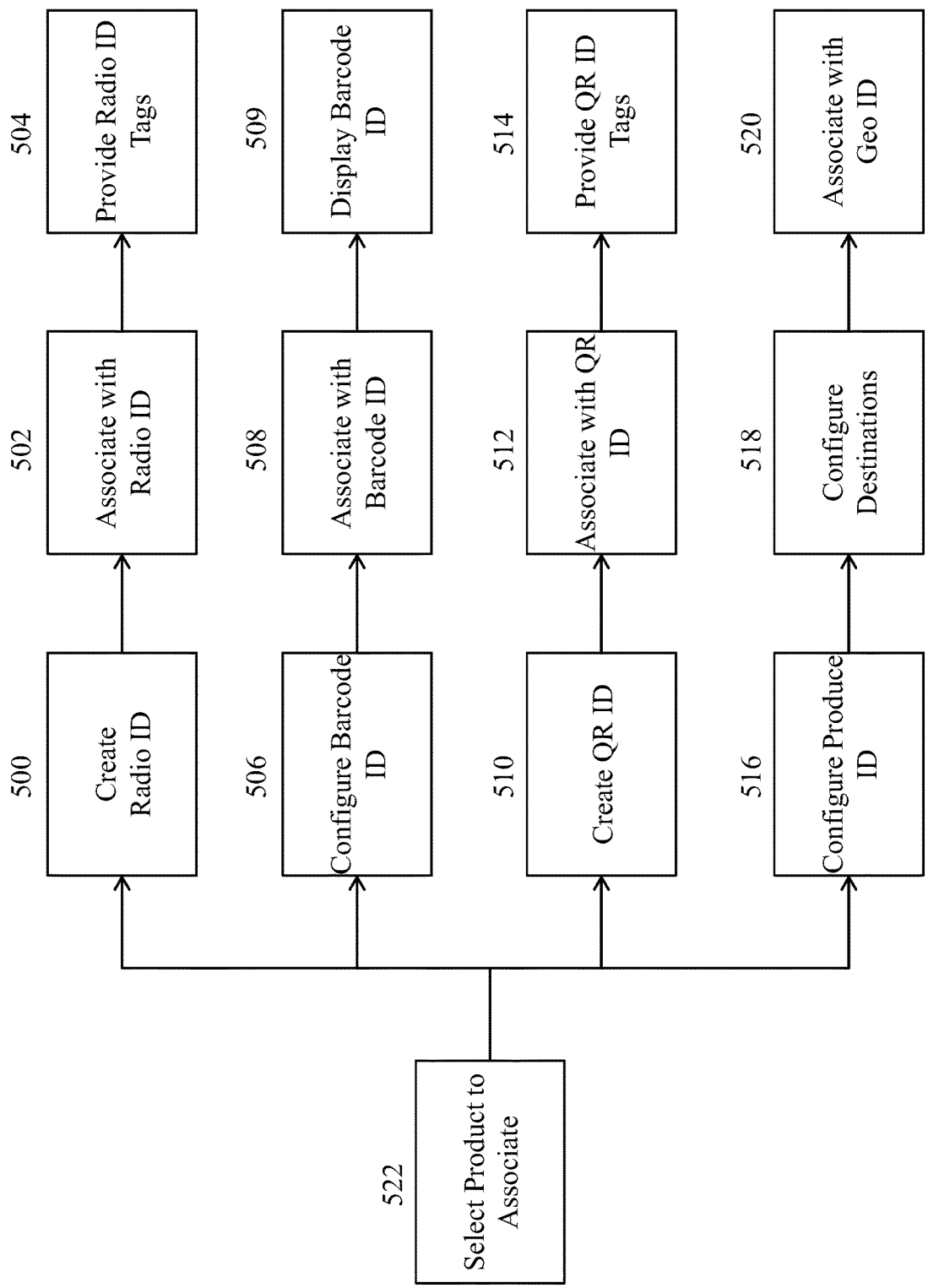
FIG. 5 is a flowchart of a set of steps for associating a product with a physical identifier in the system of FIG. 1.

Turning now to FIG. 5, we have a flowchart of a set of steps that a system could perform to associate a product with a physical identifier. Initially a product is selected (522) that needs to be associated with an identifier. This product may be selected from a list or queue of products which have completed questionnaires and product profiles entered into the system or may be manually or arbitrarily selected by a user based upon other criteria. Once a particular product has been selected, one or more associations with identifiers are made. This could include creating a radio identifier (500) by automatically generating a unique identifier, while in other embodiments, an existing identifier (such as a UPC or PLU, for use as a product identifier. This radio identifier may then be associated (502) with RFID or NFC tags so that it is machine-readable. The system operator may then provide RFID tags (504) to retailers for placement on the packaging, shelf, or display of the appropriate products. Alternately, retailers themselves may create and program radio identifier tags as needed using identifiers that are wholly or partially provided or specified by the system operator. Identification via QR code may be configured similarly, even encoding the same identifier in some embodiments, and may include creating a QR identifier (510), associating the QR identifier with a visual QR code (512), and either providing QR tags or QR images to a retailer (514), providing identifiers for the supplier or retailer to encode themselves, providing ranges of identifiers for the supplier or retailer to allocate as they wish, or using another assignment and distribution technique as will occur to those skilled in the art. Identification via barcode may be configured by identifying and configuring the pre-existing barcode (506) with the system, associating (508) the pre-existing barcode with the product profile, and displaying the barcode on or in connection with the product (509). Identification via hybrid geo identifier may occur by configuring a pre-existing product identifier or other non-unique identifier to be associated with the product (516), configuring retail destinations for the product (518) (which may include GPS coordinates or other identifiers for specific retailers that will receive the product) and associating the geo identifier with the product (520).

Figure 6:
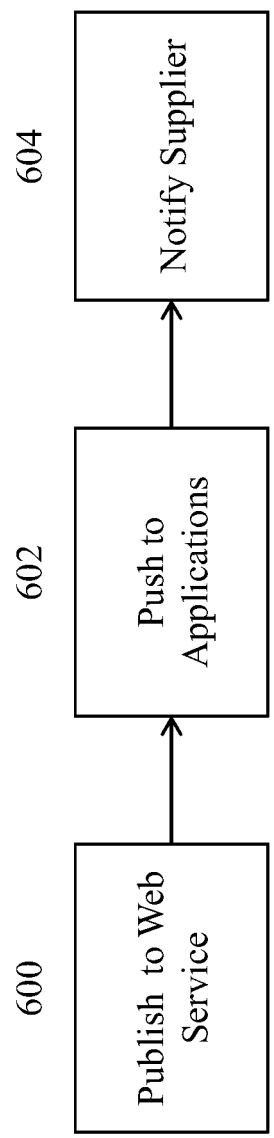
FIG. 6 is a flowchart of a set of steps for publishing an associated product to an external service in the system of FIG. 1.

Turning now to FIG. 6, we have a flowchart of a set of steps that a system could perform to publish an associated product to an external service. Once a complete product profile is created or received, including a clarity score, and the product has been associated with one or more identification methods, the product may be published to one or more services. This may include publishing the product to a web service (600), website, or other online searchable format so that it may be identified and accessed by users. This may include users using a home device (110) and searching for the product via a website, and it may also include users using a mobile device (112) that executes a mobile application which provides functionality similar to a website. Publishing may also include pushing (602) the product profile to one or more repositories, such as mobile applications that maintain product profiles locally on a device, or other third-party partners or providers who may maintain one or more product profiles on systems other than the server (100). Publishing may also include sending a notification (604) to the supplier (106) associated with the product profile that is being published, so that the supplier (106) can review the published product information, review the clarity score assigned to their product, and change or amend their answers to the questionnaire if desired.

Figure 7:
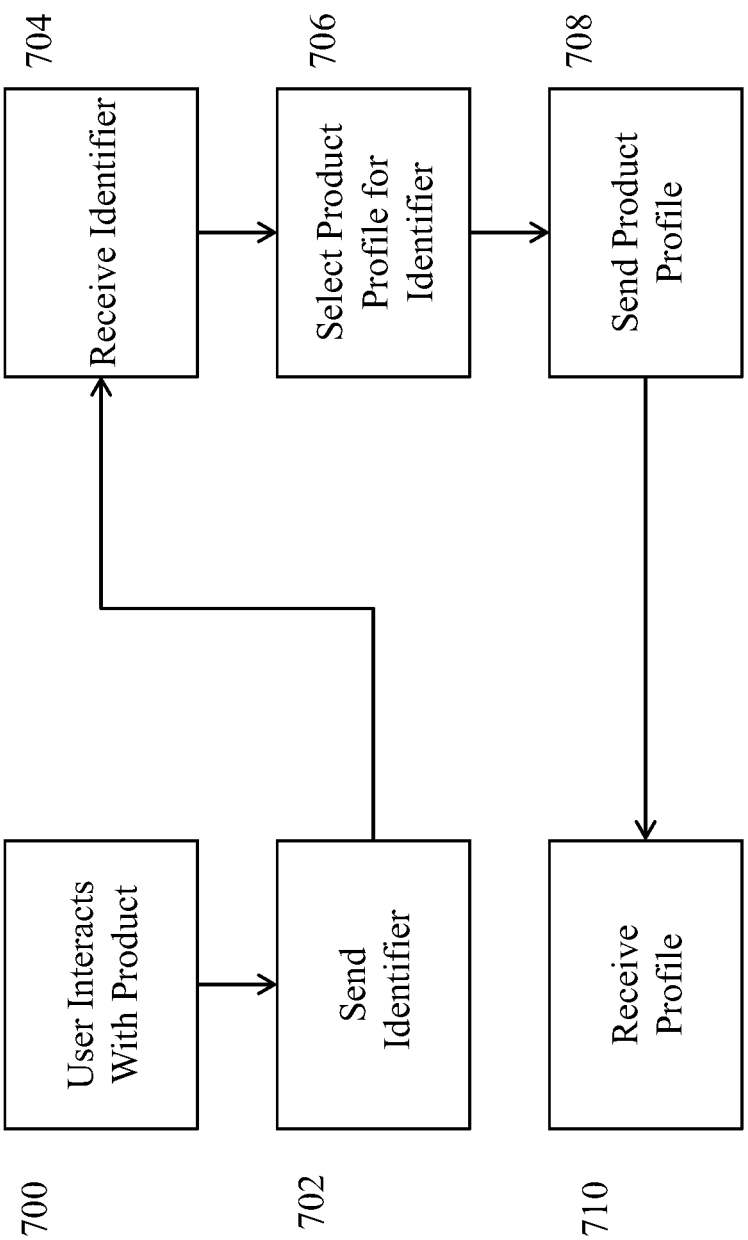
FIG. 7 is a flowchart of a set of steps for providing a product profile to a requester in the system of FIG. 1.

Turning now to FIG. 7, that figure shows a flowchart of a set of steps that a system could perform to provide a product profile to a requester. These steps apply both to requests for product profiles via a website or web service from a home device (110) as well as requests for product profiles via machine-readable components of a mobile device (112). In each case, a user may interact with a product (700) or its packaging, shelf, or display, which may include searching and selecting the product from a website or using a radio receiver to receive RFID or NFC information, an imaging device to receive barcode or QR code information, or the like. Interacting with the product (700) in some embodiments results in the reading, retrieval, or determination of a unique identifier for the product, and this unique identifier may be sent (702) to the server (100) via the product service (108). On the server (100), the identifier is received (704) and used to select (706) a product profile that is associated with the identifier. The product profile is then sent (708) back to the requester via the product service (108). The requester then receives (710) the profile on their home device (110) or mobile device (112), where it may be displayed (210).

In some embodiments, the display (210) on home device (110) or mobile device (112) is customized as a function of the location identifier segment (908) of the identifier retrieved from the product (700) or its packaging. For example, if the retrieved product identifier (900) includes a location identifier segment (908) that is associated with a specific magazine ad campaign, the display (210) of the retrieved product profile might be formatted with the greeting specific to that magazine, such as "Welcome _____ Subscriber! Here's a coupon for _____," referring to the magazine and the product that was advertised therein. Retrieval of the product profile in such circumstances is tracked and accounted for by the magazine, system operator, marketing firm, supplier, retailer, and/or other entity in the system as will occur to those skilled in the art. In other embodiments, the mobile app, webpage, or other tool being used to retrieve a product identifier encodes in the location identifier information about the type of client it is, the geographical location of the retrieval, the specific user or class of users retrieving the data, or other information as will occur to those skilled in the art. In still other embodiments, display of the product profile information itself is filtered, prioritize, or otherwise customized as a function of the location identifier.

In a variation on this embodiment, as a consumer actively retrieves information about particular products during an off-line shopping trip, the system infers the context or purpose of the trip and provides CCI as a function of those inferences. For example, a consumer who retrieves information about a can of refried beans and taco shells might be presented with a recommendation or coupon for tortilla chips or taco sauce. In another example, if the consumer retrieves information about a can of refried beans and selects a "non-GMO" profile (whether as their default profile or as a manual selection after initial information about the beans is retrieved), the system might present a recommendation of, directions to, or a coupon for non-GMO tortilla chips. Other techniques for leveraging shopping-trip inferences from consumers' selections (in a single trip or longitudinally across multiple trips) will occur to those skilled in the art in view of the present disclosure.

Figure 10:
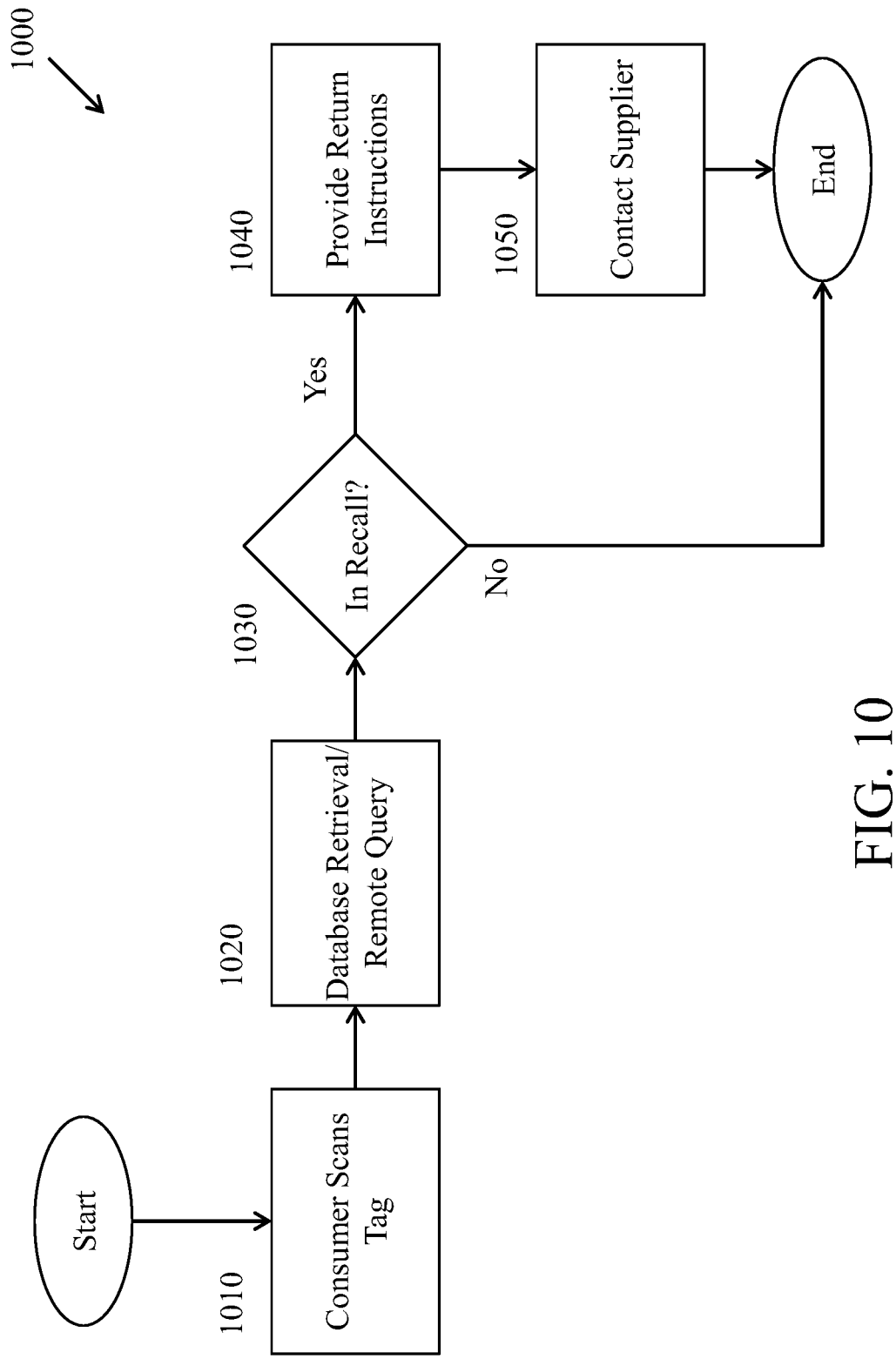
FIG. 10 is a flowchart illustrating a recall process for use in connection with the system of FIG. 1.

As suggested above, the product identifier and/or location identifier in some embodiments provide enough information to link the product to a specific production batch. Then, in the event of a recall, the consumer user in some embodiments will be able to use the identifier(s) to determine whether the specific product is part of the recall using the recall process 1000 illustrated in FIG. 10. Following this process, the customer user will scan (1010) the tag associated with the product, and a database retrieval or other remote query (1020) will let the user know whether that product is part of the recall (decision block 1030). If so, the app, webpage, or other interface will provide instructions (1040) for disposal and replacement of the recalled product, and the server (100) will contact (1050) the supplier (106) to provide notice of the identified product, in some embodiments including the location at which the product and/or location identifiers were scanned and in some cases (typically, though not necessarily, after obtaining user permission) contact information for the relevant user. If the product is not part of the recall (negative result that decision block 1030), the consumer user can rest assured that their product is not subject to the issue identified in the recall, and the supplier (106) can avoid the expense of processing a recall of a product that is safe.

Figure 8:
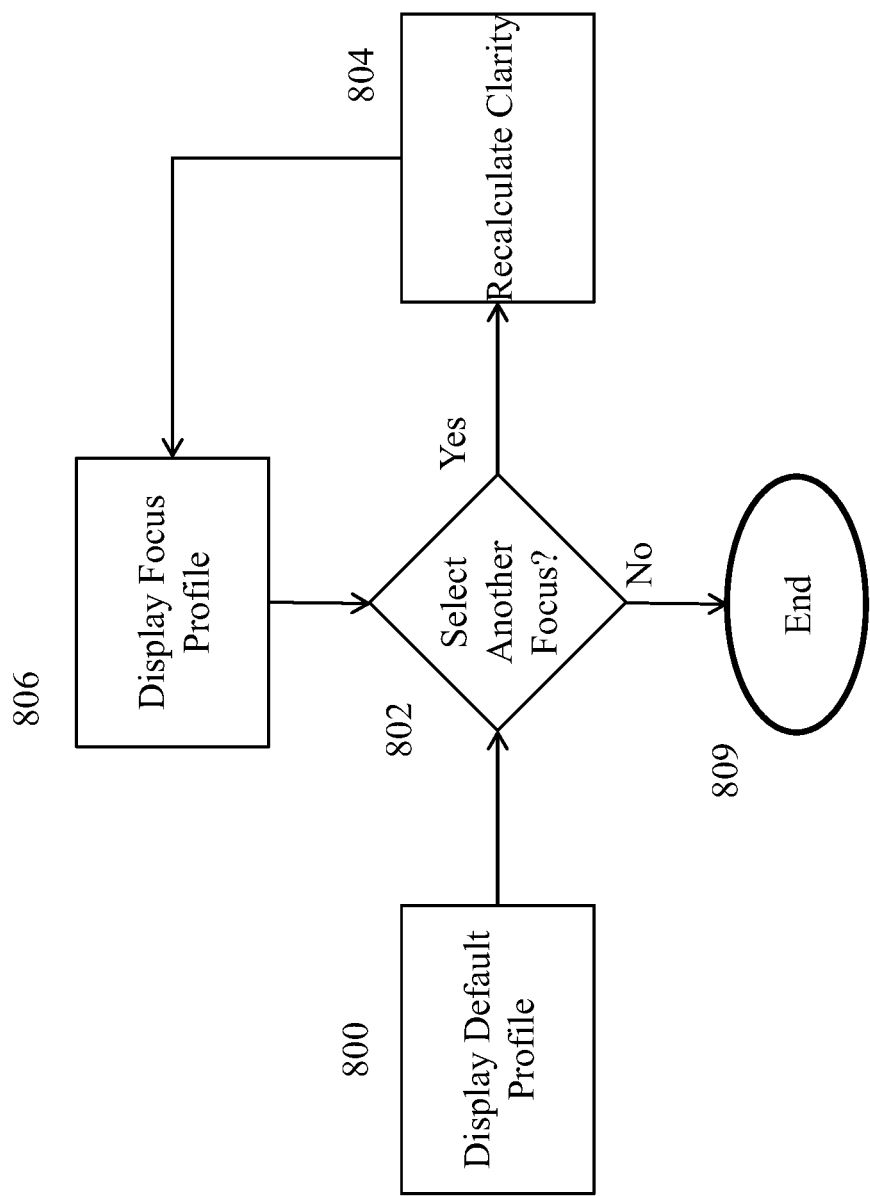
FIG. 8 is a flowchart of a set of steps for displaying a product profile in the system of FIG. 1.

Turning now to FIG. 8, that figure shows a flowchart of a set of steps that a system could perform to display (800) a product profile or CCI. Initially, after a product profile is received by a requester device (110, 112), a default profile configuration may be used to display the product profile. In some embodiments, for example, a default profile configuration might highlight several characteristics of the product that many people would consider important, and would provide additional links, tabs, pages, or views to display other information from the product profile. In many embodiments, the product clarity score will be prominently displayed as one of the highlighted elements of the default profile configuration.

Additionally, the displayed profile may provide an interface with which the user can interact to select or change the focus of the displayed profile. Different product focuses allow for quick rearrangement of the product profile as well as (in some embodiments) a more meaningful clarity score for some users. If a different focus is selected (802) by a user in certain embodiments, the clarity score is recalculated (804) by the device. In other embodiments, a focused clarity score is retrieved from the server (100) or another source, or it may be calculated or determined by the requester device (110, 112) as a function of data in the product profile. A focused clarity score may be determined similarly to a default clarity score, but the focused clarity score may weigh questions differently along certain themes. For example, if a user selects an "environmentally aware" focus, questions concerning humane treatment of workers who harvested the product may be weighted lower than when calculating the default clarity score (or not at all), and questions concerning ecological impact of the transport of the product may be weighted higher. Once the focused clarity score has been recalculated (804), or once a new clarity score has been retrieved, the profile may be redisplayed as a function of the new focus and the new clarity score (806). In addition to showing a new clarity score, this may include visually highlighting different characteristics to more prominently display supplier answers and product characteristics that are closely associated with the new focus. This may also include filtering a list of products being displayed (806) based on criteria entered by the consumer user, such as those having a clarity score of at least (or above, or below, or no more than) a certain number, those tagged with a certain badge or certification, those that answer one or more questions in the profile in a particular way, or other criteria as will occur to those skilled in the art. When the profile the user desires has been displayed, the profile selection process ends (809).

In some embodiments, the profiled products include non-food items. For example, product profiles for makeup might also be included in the database (102), and relevant questions to the makeup market would be asked by questionnaire service (104). For the makeup example, such questions might request information about chemical components, animal testing, labor, advertising ethics, and other segment-relevant issues as will occur to those skilled in the art.

III. Exemplary Extended Clarity Score

Some implementations of the disclosed system may take additional factors into account when determining (410) the aggregated overall clarity score and providing that score to recipients. While it is advantageous to determine, track, and provide objective, quantitative data that describes the visibility and availability of information relating to a product (e.g., the clarity score), it may also be desirable to consider a range of subjective, qualitative data when communicating information to consumers. Further, while it is advantageous to consider data from a small numbers of sources (e.g., such as the supplier (106) themselves and the administrator of the system of FIG. 1 and/or any third-party document verification entities as they relate to verifying the supplier's (106) provided data), especially where objectively true data is desirable, it may be desirable to also consider data from a broader set of sources, whether such data is subjective or objective in nature. Such an approach allows for the clarity score to be enriched and extended beyond its base characteristics.

This may be accomplished, for example, by associating information such as the supplier's (106) questionnaire and survey responses with additional metadata, or by building data objects that collect such information into a single object source, in order to create an extended clarity score. In varying implementations, an extended clarity score may include a single (e.g., numerical, textual, visual) output that measures a single characteristic or a blend of characteristics of the product. The extended clarity score may include a more complex set of information that may be used to produce a single output and may be used in subsets in order to produce a variety of other outputs. As an example, in some implementations an extended clarity score, as stored in a database or embodied by a software object, may itself contain an objective clarity score based on supplier (106) responses as well as a separate clarity score based on data from other sources (e.g., customer reviews, third party product certifiers) than the objective clarity score. Such an object may additionally contain or be associated with sets of metadata describing the other sources of information as well as the type and content of information that was used to build the separate clarity score (e.g., such as the source and content of a customer review and any automatically parsed or keyword associated metadata that indicates whether the review is positive or negative about varying aspects of the product).

An extended clarity score such as that described above provides additional options and flexibility to deliver (e.g., based on system configurations) and view (e.g., based on user preferences) objective and subjective data relating to products, either individually or in combination, and to further filter, refine, or focus on particular aspects of the extended clarity score. As an example, some users may prefer to only receive quantitative information such as the base clarity score, while other users may prefer to receive separate indicators of quantitative information and qualitative information, while still other users may prefer to receive a single combined or blended indication of both quantitative and qualitative information. A system supporting an extended clarity score is capable of providing varying data in varying forms depending upon the configured preferences of an administrator or party providing the system, depending upon the configured preferences of a user of the mobile device (112), or both.

Figure 11:
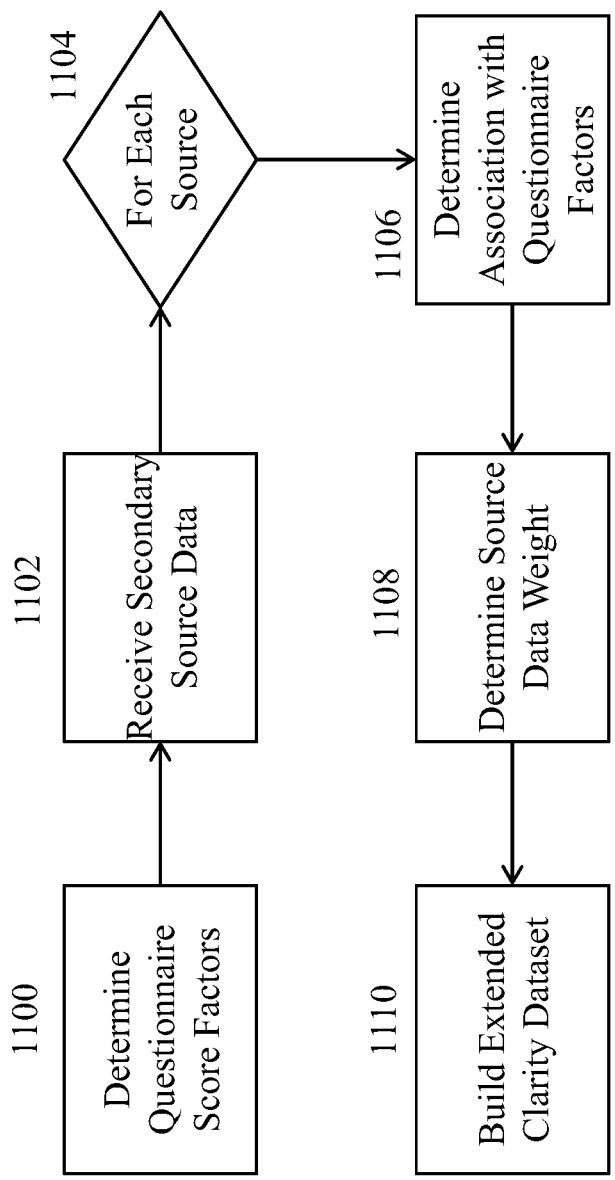
FIG. 11 is a flowchart of a set of steps for producing an extended clarity dataset.

As an example of the above, FIG. 11 shows a flowchart of a set of steps for producing an extended clarity dataset, which may be used to produce an extended clarity score object that provides one or more of the features described above. The steps of FIG. 11 may be performed in sequence or in parallel with steps such as those shown in FIGS. 3 and 4, and may include, as sub-steps, one or more of the steps shown in those figures.

When the system determines (1100) quantitative score factors, such as responses to supplier (106) surveys, the system may also receive (1102) secondary source data from one or more sources other than the supplier (106). Such data may be solicited and received from secondary sources as shown in FIG. 3, or it may be received from secondary sources after voluntary submission (e.g., voluntary review of a product, voluntary review of a supplier), or it may be received in other ways depending upon the identity and type of secondary source. As an example, a third-party product or business review aggregator or website may regularly provide batches of hundreds of reviews covering a variety of products and suppliers, while an individual may only submit a single review in response to a questionnaire or other prompt.

For each (1104) set of secondary source data, the system may determine (1106) the association that the secondary source data has with the score factors and/or underlying data that is associated with the quantitative clarity score, and may determine (1108) a weight value that indicates the secondary source's relevance to and/or credible impact on the quantitative clarity score. While some secondary source data may be considered and used to influence the extended clarity dataset even in the absence of a strong association with the base clarity score, it will be more common that the level of influence will be a function of the strength of that association. As an example, where the base, quantitative clarity score is based on a set of questions asked of the supplier (106) via a questionnaire (e.g., as shown in FIG. 3), secondary source data is likely to relate to one or more of the set of questions and/or the supplier's (106) responses. Where the set of questions is entirely or primarily directed at producing quantitative data related to the origin of the product, secondary source data that relates to the product's environmental profile or general quality may have little or no association with the questionnaire factors (1106), and so may be disregarded or may be given very little weight when determining (1108) the secondary source impact on the extended clarity dataset.

Conversely, where the set of questions is similarly directed at producing quantitative data related to the origin of the product and environmental profile, secondary source data such as customer reviews or news articles applauding or criticizing the companies' environmental practices may have a stronger association (1106) and may be given more weight (1108) in the extended clarity dataset. As has been described, the determined associations (1106) and weights (1108) may be included in the dataset without immediately modifying other aspects of the dataset (e.g., a heavily weighted negative association might not modify the base clarity score), which may provide flexibility to parse and individualize various aspects of the extended clarity dataset at the point of presentation to a buyer or consumer based upon system and user configurations and preferences.

As secondary source data becomes available, an extended clarity dataset may be built (1110) that may include the determined (1106) associations, data weights, secondary source data (e.g., review content, review source), and other information. The extended clarity dataset may be built (1110) and stored in varying forms and formats (e.g., database records, software objects), as will be apparent to those of ordinary skill in the art in light of this disclosure.

Figure 12:
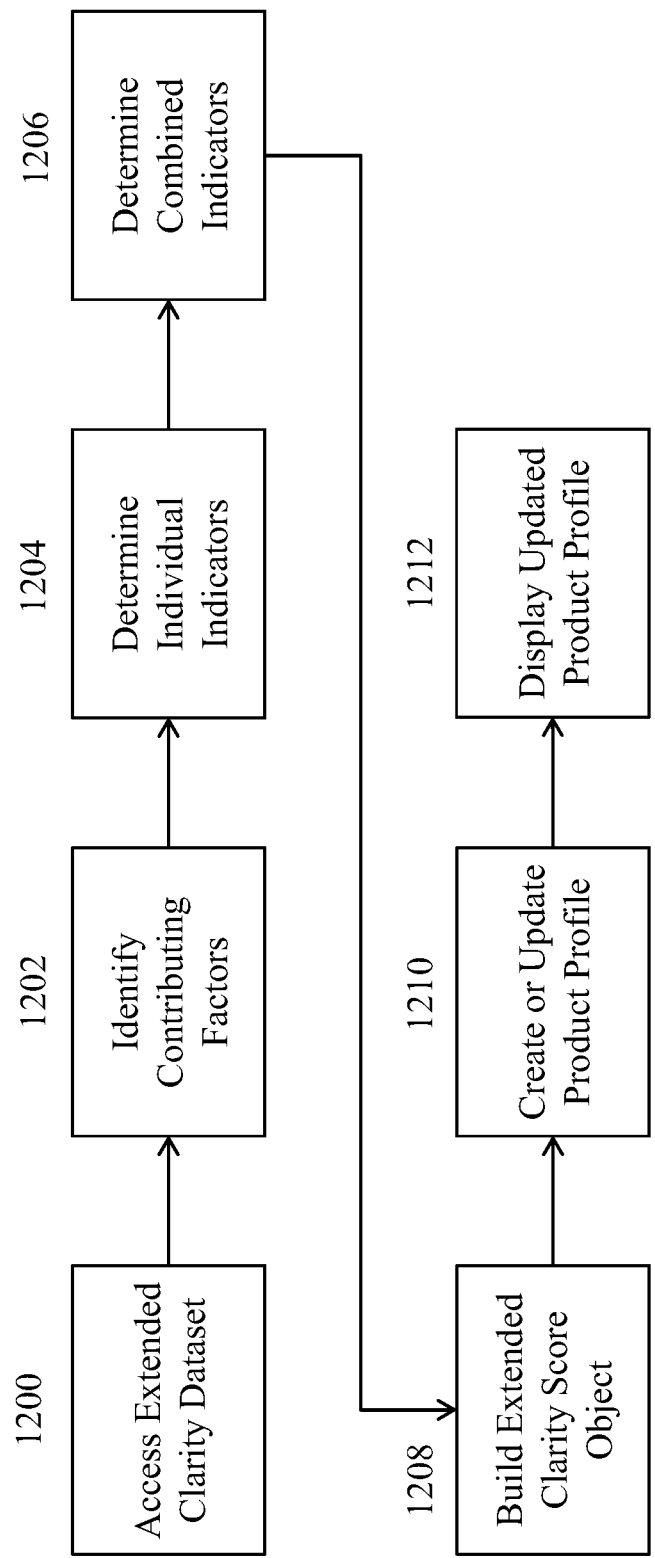
FIG. 12 is a flowchart of a set of steps for producing an extended clarity score object.

The system may then produce extended clarity scores (e.g., either individual scores, ratings, or indications, or complex objects and datasets that may be used to produce a variety of indications), as shown in FIG. 12. When the extended clarity dataset is available (1200), the system may identify (1202) one or more characteristics of the dataset to be passed along to users of the system, based upon system configurations and/or user preferences, which may vary widely. As an example, in some implementations the identified (1202) factors that will contribute to the data provided to the user include the quantitative clarity score and underlying supplier (106) response data as well as the secondary source data (1102) and related associations (1106) and weights (1108). Data not identified (1202) as relevant at this stage may be discarded from the dataset to reduce its size, or such data may be retained in order to enable local re-determinations of the extended clarity score without having to retrieve that data from the server. As an example, secondary source data that has little or no association (1106) may be ignored or discarded.

With the relevant contributing factors identified (1202), the system may then determine (1204) one or more indicators that are associated with individual characteristics or factors, may determine (1206) one or more indicators that are associated with combinations of characteristics or factors, or both. In this context, an indicator may include any information, whether numerical, visual, textual, audible, or otherwise that describes or indicates information related to the associated characteristic or factor. Thus, a quantitative, numerical clarity score is itself an indicator (e.g., "94 out of 100" clarity score), and the same information represented as text (e.g., "High Clarity") or as visually distinct elements (e.g., a green star, gold star, checkmark) is also an indicator.

In the example of a quantitative clarity score, such an indicator would be determined (1204) based on an individual characteristic of the dataset (e.g., the clarity score). Similarly, an indicator could be separately determined (1204) based only on secondary source data. Based on this example, a first numerical indicator may indicate a clarity score of 94 out of 100, while an additional or alternative second textual indicator may indicate that, based on customer reviews, a product or supplier (106) is "Trusted by Users."

A determined (1206) combined indicator may be based on several combined characteristics or factors, and it may be determined as an alternative to or in addition to individually determined (1204) indicators. Continuing the example above, a determined (1206) combined indicator based on the first numerical indicator and the second textual indicator may indicate that the product or supplier is "Transparent and Trusted," or may receive other similar text, numerical scoring, or visual indicators (e.g., a trophy graphic indicating they achieved positive ratings across several categories).

After associating one or more numerical, textual, visual, or other indicators with the extended clarity dataset based upon some or all of the data available, an extended clarity score may be built (1208) as stored data and/or software objects (e.g., such as an extendedClarityScore class object having various attributes storing some or all of the extended clarity dataset, as well as the determined (1204, 1206) indicators, and in some implementations having class functions or methods to aid in examining or further modifying and returning data).

The system may then create (1210) or update an extended product profile based on the extendedClarityScore object (e.g., as described in at least FIGS. 5, 6, 9 and the associated text). Product profiles that are created (1210) based in part on extended clarity information may include any of the previously described data or features, and may also include additional numerical, textual, visual, or other indicators that are determined (1204, 1206) and associated with the extended clarity object.

Further, some implementations will allow varying aspects, views, or focuses (e.g., as described in FIG. 8) of the clarity data to be accessed or viewed based on the extended clarity score object without returning to the server (100) or another remote device, allowing for entirely local or offline access to the information in various forms. In this manner, extended clarity score objects may be requested by devices when accessed (e.g., scanned, looked up, or otherwise selected) at a location where they are sold, or in some cases may be pre-loaded to a device based on the likelihood they will be needed (e.g., based on a user's requests or observed habits relating to certain suppliers, retailers, or products).

As with prior examples, product profiles may be displayed (1212) to users of the system via a mobile device, home computer, or other device having a software interface (e.g., web browser, mobile application, API) configured to interact with the platform. Product profiles based on an extended clarity score may be static or dynamic in varying implementations. As an example, in some implementations a product profile may be displayed (1212) as one or several indicators, such as a product profile that displays a product with a numerical clarity score and a "Trusted by Users" qualitative clarity score based on secondary sources. In other implementations, a product profile may instead display a combined indicator such as "Transparent and Trusted," or may display a color, image, or other data indicating positive feedback and transparency. In yet other implementations, a product profile may be dynamic, and may initially display the indicator "Trusted and Transparent" along with interactive elements that allow various other indicators and data subsets to be displayed in the context in which they influenced the "Trusted and Transparent" indicator. As an example, a user may click on "Trusted" to view secondary source indicators and data, or they may click on "Transparent" to view a quantitative clarity score. Other varying ways to display (1212) the product profile exist and will be apparent to those of ordinary skill in the art based on this disclosure.

IV. Exemplary Location-Based Clarity Information

Some implementations of the system of FIG. 1 that provide clarity scores and/or extended clarity scores for products and suppliers may also be configured to provide clarity information that is specific to locations such as business locations, buildings or other structures, or public spaces such as parks and walkways. Location-based clarity information may have some overlap with product-based clarity information (e.g., some questionnaire questions answered by a business or location owner may relate to environmental impact of the location), but also includes distinct information that will not typically be associated, or may only be indirectly associated, with a particular product. Location-based clarity information may include information describing aspects of cleaning, maintenance, and other facility management tasks that are associated with the location. This information may be gathered via questionnaire responses (e.g., as described in FIG. 3) and then analyzed and weighted (e.g., as described in FIG. 4) in order to produce location-specific clarity scores. These location clarity scores may be associated with the location by placing wireless beacons or optical codes at the location (e.g., as described in FIG. 5), or they may be associated with GPS or other geographical coordinates that correspond to the location.

A user of a home device (110) or mobile device (112) may access clarity profiles for the business (e.g., as described in FIG. 7) by scanning or interacting with a visual code or other link at the location or displayed at a web address associated with the location. In some implementations, a mobile device (112) may automatically access and provide profile information based on GPS coordinates produced by the mobile device (112) that indicate the possessor is located within or proximate to the location. Additionally, consumer notices associated with the location may be communicated to users (e.g., as described in FIG. 10) based on currently viewing or previously viewing profiles for locations, and such notices may additionally provide instructions related to the consumer notice for the location. As an example, a user that is determined (based, e.g., upon their GPS coordinates and viewing of the profile for that location) to have visited a location may be provided a later notice of a health or safety issue that may have existed at that location at the time of their visit, and may be provided (1040) instructions indicating whether they need to take any action related to the notice (e.g., such as being aware of or seeking medical advice for a risk of food poisoning or exposure to asbestos).

Location-based clarity information may include quantitative clarity scores, extended clarity scores (e.g., a mix of quantitative and/or qualitative information), or both. As an example, location-based clarity information may include secondary source data received (1102) and associated with the information from a variety of sources (e.g., visitors to the location, employees at the location, contractors performing duties at the location, public or private organizations that perform inspection and certification of the location). Such information may impact clarity ratings for the location based on source and weight (1108) and may be used to build an extended clarity dataset (1110) for the location.

A location-based clarity dataset may be used to determine various indicators for the location (e.g., "Focus on Sanitation" indicating complete and credible responses to questions related to cleaning and sanitation or a red exclamation point indicating lack of response or lack of credibility in response to questions). The clarity dataset and indicators may then be used to build extended clarity objects for the location and provide those to visitors or potential visitors.

Figure 13:
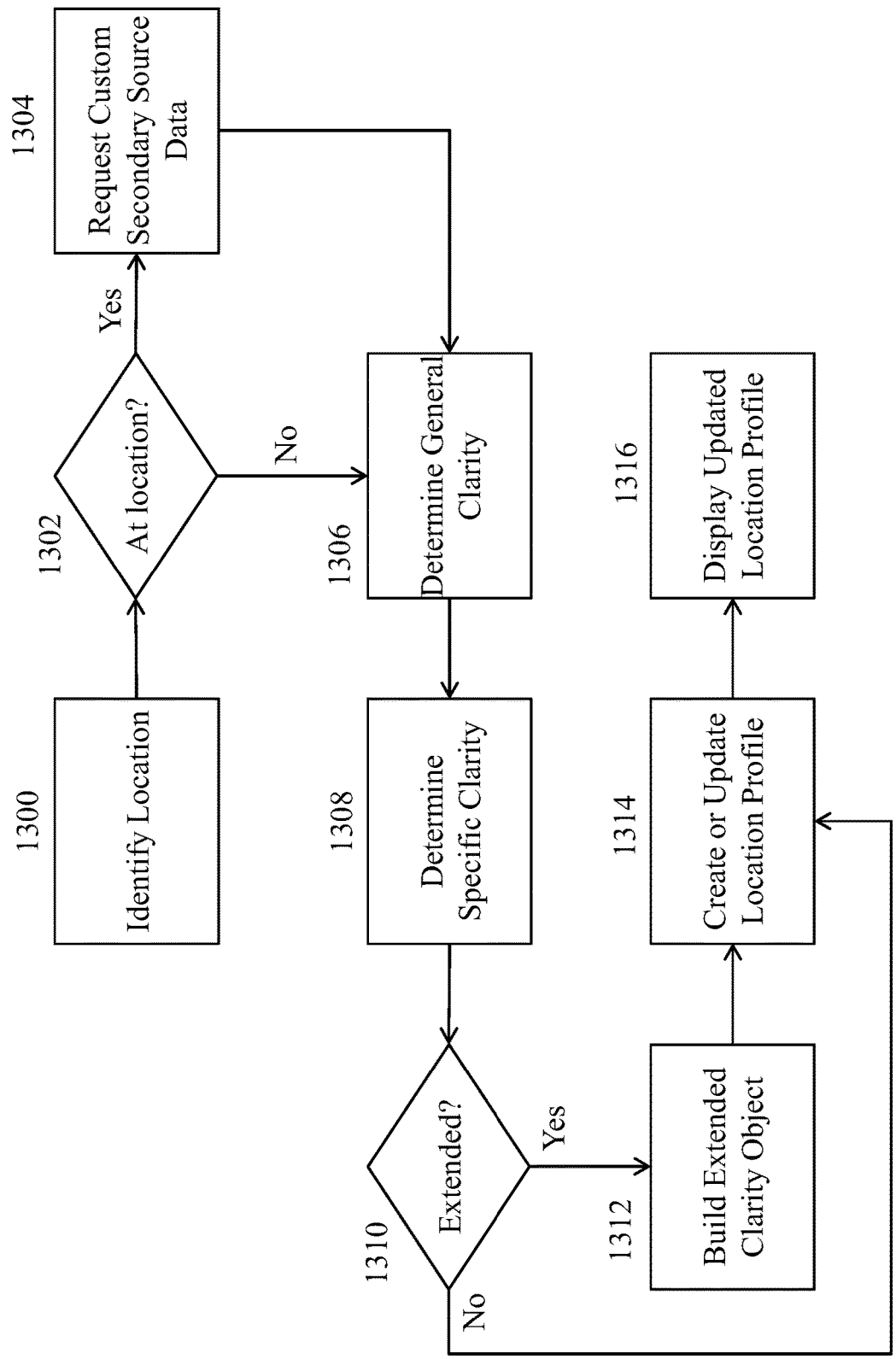
FIG. 13 is a flowchart of a set of steps for producing and providing location-based clarity information.

As an example of the above, FIG. 13 shows a set of steps that may be performed to manage and provide location-based clarity information. When a user of a device such as the mobile device (112) identifies (1300) a location, the system will determine (1302) if the user is physically present at the location. This determination (1302) may be made based upon a visual code being scanned that corresponds to a visual code that is physically present at the location (e.g., a QR code placed on a door providing entry to the location), or based upon GPS coordinates of the mobile device (112), or both. When the user is physically present at the location, the system may request (1304) information from the user that relates to the location-based clarity information. This information may be requested via email or other electronic message, or may be provided via a software application (e.g., such as a mobile application on the mobile device (112)), and may request the same or similar information from a number of visitors to the location, or may be dynamically customized for that particular visitor at that particular visit. Responses to the request (1304) may be received (1102) as secondary source data and used when building (1110) an extended clarity dataset for the location, as an example.

Examples of static questions provided to and answered by visitors might include "Does the location appear clean?", "Is the location crowded?", "Does the location have touchless entry and/or payment options?" or other similar questions relating to health and sanitation, maintenance, upkeep, or other facility management issues at the location.

Examples of dynamic questions that may be provided to visitors based upon their particular visit may be based in part upon questionnaire answers from the location owner. As an example, a user visiting a location on a day and time (e.g., Wednesday at 3 PM) that the location owner has indicated is the time that a daily or weekly deep clean of the kitchen is performed may be prompted to verify whether or not they see cleaning activities occurring. Locations that have highly visible practices (e.g., they have answered and/or provided supporting information for their cleaning practices) that have also been verified by visitors in this manner may be associated with indicators such as "Transparent and Trusted" or high numerical scores, for example. Secondary source data may also be requested from regular employees or contractors that are at the location and that have configured a mobile device to operate on the platform, and this information may provide a particularly credible indication of whether quantitative information associated with the location is credible.

Next, the system may determine (1306) a general clarity dataset for the location and may determine (1308) a specific clarity dataset for the location, each of which may be a quantitative clarity score or an extended clarity dataset depending upon varying implementations. General clarity datasets may be built from the entirety of information associated with the location by questionnaire responses and/or secondary sources, and they may represent a generalized clarity that a visitor may have with the location (that is, they may represent the transparency of the available information about the location) on any given visit. Specific clarity datasets may be built from information that is more closely associated with that specific visit based on the day and time of the visit, or such data sets may be based upon secondary source data that is recently received in response to requests (1304) from other visitors to that location. Specific clarity, whether a quantitative score or extended clarity dataset, represents the clarity that a visitor may have with the location (that is, the transparency of the available information about the location) for that particular visit.

This may be advantageous where, for example, a location provides a high or moderate level of clarity in their responses to questions on cleaning generally, but it unable to identify specific days, schedules, or times that cleaning tasks are performed, or is only able to verify that cleaning is performed on some but not all days of the week. In this case, a general clarity dataset for the location may indicate that the location is generally transparent on cleaning and sanitation (e.g., a "Regularly Sanitized" indicator, or a general location clarity score of 75/100), while the specific clarity dataset may instead indicate that it is unclear whether the location was cleaned the day of the visitor's specific visit (e.g., an indicator of "Recent sanitization unclear," or a specific location clarity score of 0/100).

Where the system is implemented to manage and provide extended (1310) clarity information, one or more of the steps of FIG. 12 may be performed to identify relevant clarity factors (1202) and associate the clarity factors with one or more indicators (1204, 1206) such as numerical, textual, and visual indicators. As has previously been described, the system may then build (1312) an extended clarity object. Whether only quantitative clarity information or an extended clarity object is provided, the system then creates (1314) or updates a location profile for that location and causes the mobile device (112) or other user device to display (1316) the location profile.

IV. Exemplary Use Cases

Figure 14:
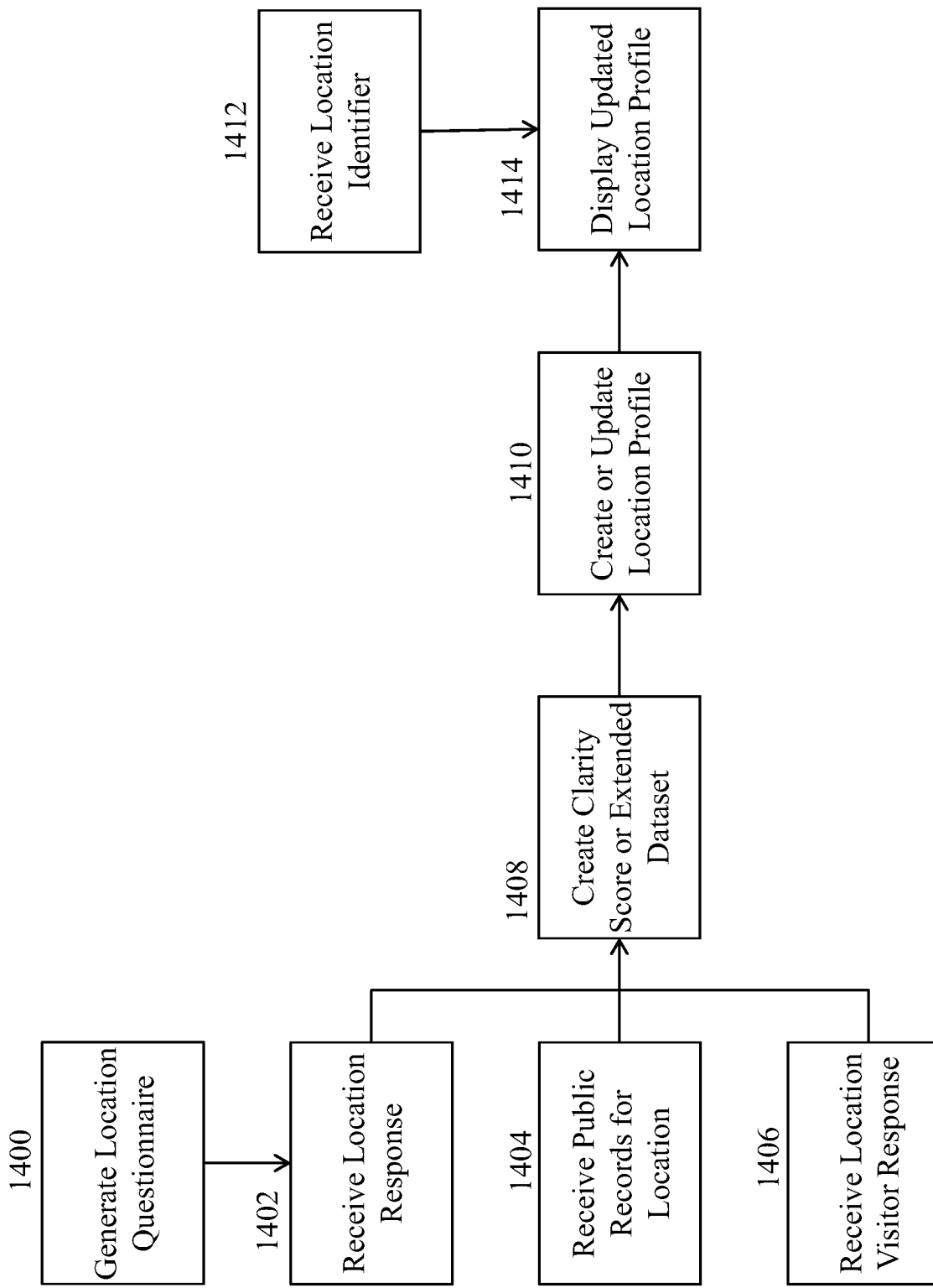
FIG. 14 is a flowchart illustrating a use case for providing clarity information for public spaces.

As has been described, clarity scores and extended clarity scores may be implemented in varying ways and for various purposes. As an additional example, FIG. 14 illustrates a use case for providing clarity information for public spaces or for certain areas or fixtures within public spaces and may be advantageously used in spaces that are commonly shared between individuals. Examples of such public, shared spaces include restaurants (e.g., a lobby area, restroom, or booth); passenger vehicles such as airplanes, busses, trains, or subway cars (e.g., individual seats or common areas such as restrooms); waiting rooms related to medical care or government services (e.g., a lobby, seat, or waiting area for a hospital or motor vehicle department); and other spaces that are associated with use by multiple individuals during the course of a single day or over several days.

During a use such as that shown in FIG. 14, the server (100) may generate (1400) and provide a questionnaire to an employee or administrator of each affected location. The generated (1400) questionnaire may include static questions, dynamically selected questions, or both. Dynamically selected questions may be selected based upon the country, city, or state that the location is in and may be associated with local law or regulation (e.g., such as cleaning standards for a restaurant or hospital) or may be otherwise configured. Dynamic questions may also be selected based upon a type of the location, such that a restaurant, hospital, or airplane may receive questions specific to that setting (e.g., a restaurant may be associated with questions about food preparation, while an airplane may be associated with questions about cabin air filtering and circulation). As locations provide responses to the questionnaire, those responses may be received (1402) by the system and utilized to produce (1408) clarity scores, extended clarity datasets, or both, as has been described.

The server may also receive (1404) public records via an API or software interface, or via an automated search of public records or records available via the internet. Public records may include information from public governments (e.g., country, state, city) such as health inspection records and results, information from private entities that provide information related to businesses (e.g., such as private business rating bureaus), or information from public sources such as news stories. Received (1404) public records may also be used as part of producing (1408) clarity scores, extended clarity datasets, and other information, as has been described.

The server may also receive (1406) information directly from visitors to the location. This may include customers visiting a restaurant and indicating that the restaurant was sanitary or that sanitation records and practices were readily available or apparent at the restaurant, or may include a passenger flying on a particular airline indicating that their seat was sanitized and cleaned shortly before they arrived, for example. Received (1406) responses and reviews from visitors to the location may also be used as part of producing (1408) clarity scores, extended clarity datasets, and other information, as has been described.

As information is received and associated with the location, the system may build (1408) a clarity score, extended clarity dataset, or both for the location based upon the input data, as has been previously described in at least FIGS. 4, 12, and 13. A profile for the location may be created (1410) or updated based upon the created (1408) clarity information, such as described in FIGS. 12 and 13 and elsewhere (e.g., in the context of creating (1210, 1314) or updating profiles as illustrated by those figures).

In order to provide the created (1410) profile, the system may receive (1412) a location identifier from a user device of a visitor to a particular public location. The location identifier may include a unique identifier (e.g., an integer or string associated with a QR code or wireless beacon in communication with the user device), a location (e.g., from a GPS capability of the user device), or other identifying information. The received (1412) identifier may be used to identify a corresponding profile and may be displayed (1414) to the user via the user device.

To illustrate an additional example of the above, in one implementation a restaurant may have a QR code placed near a door that provides entry to the location. A visitor to the restaurant may scan the QR code with a smartphone to transmit a unique identifier to be received (1412) by the system. In response, the system may display (1414) a profile corresponding to the received (1412) identifier via the user device, which may include displaying a clarity score, some or all of an extended clarity dataset, or both. The above functionality may be paired with a mobile application or other software application that allows a user to track restaurants they visit, mark restaurants as "favorites," and search for restaurants using a variety of search criteria including clarity-related filters.

The profile displayed (1414) for the location may be built from received (1402) responses from the location asking questions such as whether the kitchen, bathrooms, and dining are disinfected at least once per day, or whether the restaurant complies with other requirements or recommended practices provided by governmental agencies or private groups. The profile may also be built from received (1404) public records that may provide information from health inspection groups or may provide links to or descriptions of health inspection history for the restaurant. The profile may also be built from received (1406) information from visitors to the location, such as reviews, ratings, or scores describing aspects of the location (e.g., such as a score indicating the visitor's impression of the overall cleanliness of the restaurant).

To illustrate another example of the above, in one implementation an airline may have a QR code placed at each seat in the airplane. A passenger seated in the airplane may scan the QR code for their seat with a smartphone to transmit a unique identifier to be received (1412) by the system. In response, the system may display (1414) a profile for a particular seat that corresponds to the received (1412) identifier via the user device, which may include displaying a clarity score, some or all of an extended clarity dataset, or both.

The profile displayed (1414) for the location may be built from received (1402) responses from the location (e.g., an airline) asking questions such as whether the seat was disinfected after the preceding occupant, whether the cabin air filter for the plane or for the air conditioning system for that seat had been changed after the preceding flight, or other questions relating to the status of that particular seat. The profile may also be built from received (1404) public records that may provide information describing the safety, health, and sanitation practices of the airline or airplane, any information indicating the airline or airplane has recently been the vector of a contagious disease or illness, or other information such as inspection results or inspection history. The profile may also be built from received (1406) information from visitors to the location, such as reviews, ratings, or scores describing aspects of the location (e.g., such as a score indicating the visitor's impression of the overall cleanliness of the seat or airplane), or may include information such as self-reporting from a passenger that recently occupied that airplane or that seat indicating that they may have been carrying a contagious illness during their time on the flight.

The above functionality may be paired with a mobile application or other software application that allows a user to track airlines that they have used or viewed, mark airlines as being favorites, and search for airlines or flights using a variety of search criteria including clarity related filters. Further, it should be apparent that the above examples may be readily extended into other applications and spaces, such as stadiums, concert halls, subways, public park benches, waiting rooms, or other shared spaces.

Figure 15:
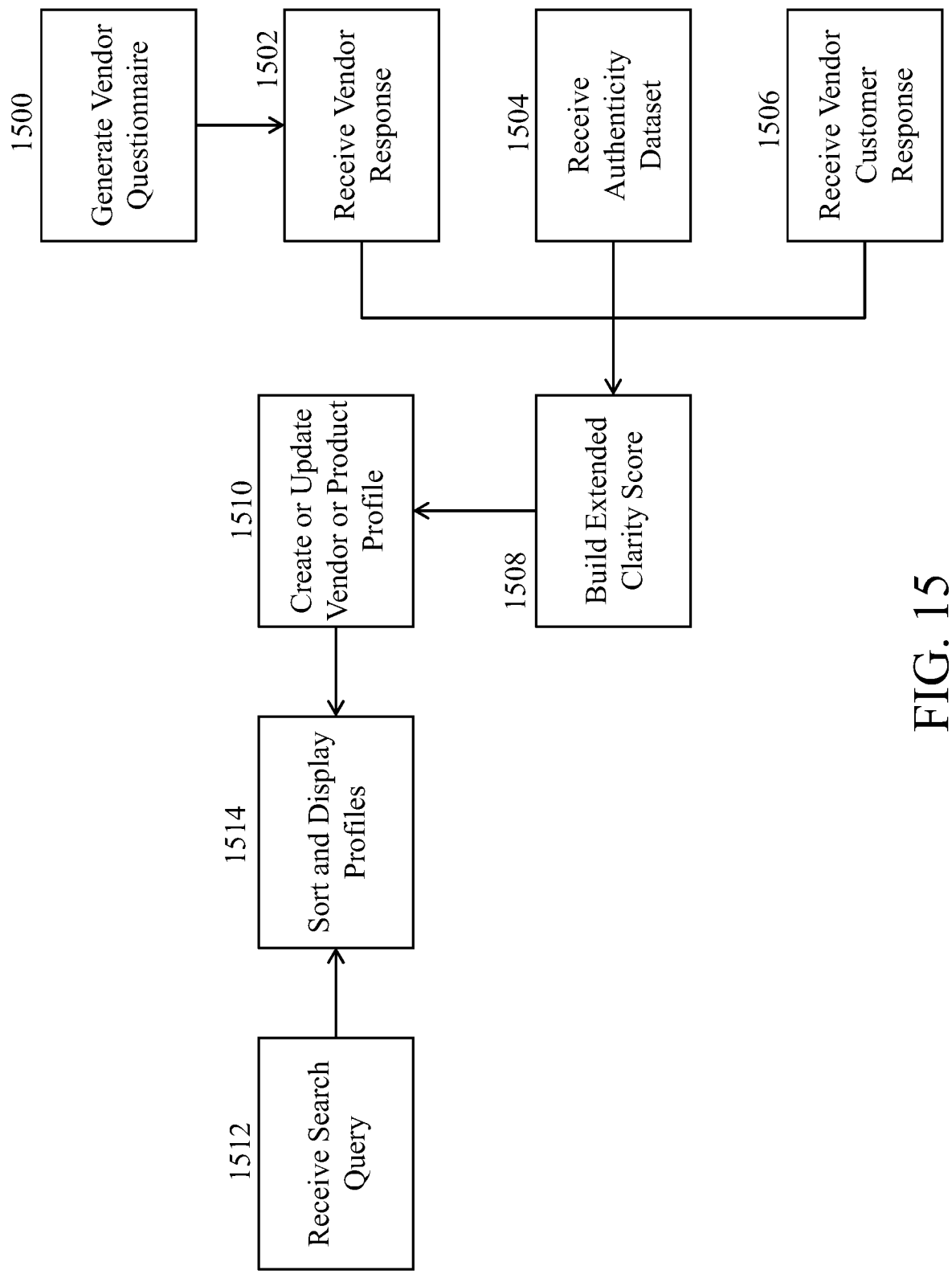
FIG. 15 is a flowchart illustrating a use case for providing clarity information for online shopping.

As an additional example, FIG. 15 illustrates a use case for providing clarity information for online vendors. The server (100) may generate (1500) and provide a questionnaire to an employee or administrator of each affected online vendor. The generated (1500) questionnaire may include static questions, dynamically selected questions, or both. Dynamically selected questions may be selected based upon the country, city, or state that the vendor is located in and may be associated with local law or regulation or may be otherwise configured. Dynamic questions may also be selected based upon the types of goods sold by the vendor, such that a vendor selling wine may receive questions about the authenticity, storage, shipment, and sourcing practices for their wine, while a vendor selling apparel may receive questions about the sources, materials, and production methods for their apparel. As vendors provide responses to questionnaire, those responses may be received (1502) by the system and utilized to produce (1508) clarity scores, extended clarity datasets, or both, as has been described.

The server may also receive (1504) public records via an API or software interface, or via an automated search of public records or records available via the internet. Public records may include information from public governments (e.g., country, state, city) such as citations or civil disputes relating to the vendors business practices, or investigations and warnings related to counterfeit or gray market goods, or may include publicly available news articles or other information sources describing the same. Received (1504) public records may also be used as part of producing (1508) clarity scores, extended clarity datasets, and other information, as has been described.

The server may also receive (1506) information directly from visitors to the location. This may include customers viewing or transacting with the vendor and indicating that the transacted goods match (or do not match) the quality and descriptions provided by the vendor, for example. Received (1506) responses and reviews from visitors to the vendor may also be used as part of producing (1508) clarity scores, extended clarity datasets, and other information, as has been described.

As information is received and associated with the location, the system may build (1508) a clarity score, extended clarity dataset, or both for the vendor based upon the input data, as has been previously described in at least FIGS. 4, 12, and 13. A profile for the vendor may be created (1510) or updated based upon the created (1508) clarity information, such as described in FIGS. 12 and 13 and elsewhere (e.g., in the context of creating (1210, 1314) or updating profiles as illustrated by those figures).

In order to provide the created (1510) profile, the system may receive (1512) a search query or vendor identifier from a user device of a visitor to a particular vendor storefront (e.g., online virtual storefront, but also potentially a brick and mortar location). The received (1512) query may identify particular vendors or particular products for which profiles are desired, or the received (1512) query may include a search string configured to return a sorted list of vendors or products that is sorted and filtered based upon one or more criteria (e.g., "show all vendors selling wine in my state and sort by clarity score starting with the highest clarity score).

To illustrate additional example of the above, in one implementation an online vendor selling chocolate, apparel, and wine may have been assessed for clarity information by the system. A visitor to a vendor website may view, search, and sort products based upon various criteria including clarity information (e.g., where the vendor website accesses the system to pull and provide product and vendor profiles via an API or other interface). Alternately, a visitor may use a search engine or vendor/product aggregator website to view, search, and sort products and vendors based upon clarity information (e.g., where the search engine is provided as part of the system or accesses the system via an API or other interface).

Based upon the visitor's interactions with the website and resulting queries received (1512) by the system, the system may provide or cause to display (1514) one or more profiles corresponding to the received (1512) search query, which may include displaying a clarity score, some or all of an extended clarity dataset, or both for one or more products or vendors in a sorted or unsorted list. The above functionality may be paired with a website, mobile application, or other software application that allows a user to track vendors they visit or patronize, mark vendors as being favorites, and search for vendors using a variety of search criteria including clarity related filters. Further, it should be apparent that the above examples may be readily extended into other applications, such as online vendors of in-home services or consulting, or sellers of other goods such as artwork, electronic devices, vehicle parts, and other areas where clarity of source and authenticity may be advantageous.

The profile displayed (1514) for the vendors or products may be built from received (1502) responses from the vendor asking questions such as whether the vendor is certain or uncertain about whether imported chocolate or wine have been verified for authenticity by an import or export agency, whether their chocolate or wine has an authentication code or identifier that may be checked against a centralized database, whether the vendor's warehouse workers checked the goods prior to shipment to verify their authenticity and lack of tampering, or other questions. The profile may also be built from received (1504) public records that may provide information from government bodies indicating that the vendor is being investigated for or has been cited for production or sale of counterfeit goods, or whether online sources such as news stories or websites indicating that the vendor is an untrustworthy source of wine, chocolate, or apparel. The profile may also be built from received (1506) information from visitors and customers of the vendor, such as reviews, ratings, or scores describing aspects of vendor and purchased products (e.g., whether a majority of customers agree that purchased wine matched their expectations based on its advertised origin, territory, or other characteristics).

It should be noted that the claimed subject matter is directed to a system that uses a combination of special purpose computers, user devices, and tangible machine-readable identifiers to deliver data to a user in a manner that represents an improvement in the way that such systems work due to the organization, location, and distribution of the delivered data. Further, the claimed subject matter solves technical problems using technical solutions. For example, one or more of the claims describe limiting the volume of data delivered to a user by converting that data into a representative format, providing interfaces between user devices and high-volume and variable-size items with the use of a variety of machine-readable identifiers, and providing on-demand safety notices on a per-item basis, in addition to other technical solutions. These technical solutions, having been described and claimed with specificity, represent significantly more than any abstract idea that they may be alleged to contain.

Further variations on, features for, and applications of the present technology will be apparent to, and could be practiced without undue experimentation by, those of ordinary skill in the art in light of this disclosure. Accordingly, the protection accorded by this document, or by any related document, should not be limited to the material explicitly disclosed herein.

What is claimed is:

1. A system comprising one or more processors configured to:
    a. provide access to an information input interface and an information output interface;
    b. communicate with a user device via the information output interface;
    c. receive a plurality of item descriptors via the information input interface and store the plurality of item descriptors, wherein each of the plurality of item descriptors originates from an item provider user;
    d. for an item descriptor of the plurality of item descriptors, determine an item clarity score based upon the item descriptor and associate the item clarity score with the item descriptor;
    e. receive an identifier query from the user device and identify the item descriptor based on the identifier query; and
    f. cause the user device to show at least the item clarity score for the item descriptor associated with the identifier query.

2. The system of claim 1, wherein the identifier query originates from a machine-readable identifier positioned proximate to an item that is associated with the item descriptor.

3. The system of claim 2, wherein the machine-readable identifier is selected from the group consisting of:
    a. an optical identifier; and
    b. a radio identifier.

4. The system of claim 2, wherein the one or more processors are further configured to receive a current geographical location from the user device, and wherein the identifier query is determined based upon the machine-readable identifier and the current geographical location.

5. The system of claim 1, wherein the item descriptor comprises three or more of:
    a. an item origin;
    b. an item certification;
    c. an item component;
    d. an item production history; and
    e. an item transportation history.

6. The system of claim 1, wherein the configuration for determining the item clarity score based upon the item descriptor comprises the one or more processors being configured to:
    a. determine a set of provided item characteristics, the set of provided item characteristics comprising a plurality of requested item characteristics that were provided via the information input interface;
    b. determine a set of withheld item characteristics, the set of withheld item characteristics comprising a plurality of requested item characteristics that were not provided via the information input interface;
    c. for each of the set of provided item characteristics, increase a provisional clarity score by an amount based on that provided item characteristic;
    d. for each of the set of withheld item characteristics, reduce the provisional clarity score by an amount based on that withheld item characteristic; and
    e. convert the provisional clarity score into the clarity score.

7. The system of claim 6, wherein the provisional clarity score is selected from the group consisting of:
    a. a numerical indicator;
    b. a text indicator;
    c. a graphical indicator; and
    d. an audible indicator.

8. The system of claim 1, wherein the one or more processors are further configured to, using the item descriptor, identify an item safety notice associated with the item descriptor, and cause the user device to show the item safety notice.

9. The system of claim 1, wherein the information input interface is configured to provide to the item provider user a set of item queries for the item, and wherein each response to each query of the set of item queries is added to the item descriptor for the item.

10. The system of claim 1, wherein the one or more processors are further configured to:
    a. determine the item clarity score based upon the item descriptor using a default profile;
    b. receive a profile selection from the user device, wherein the profile selection specifies a new profile other than the default profile;
    c. determine a profile-specific item clarity score based upon the item descriptor and the new profile, wherein the new profile comprises a set of characteristic-specific weightings for a set of characteristics of the item descriptor; and
    d. cause the user device to show the profile-specific item clarity score.

11. The system of claim 10, wherein the new profile is selected from the group consisting of:
    a. a dietary profile;
    b. an environmental impact profile; and
    c. an origin profile.

12. The system of claim 1, wherein the one or more processors are further configured to:
    a. receive a search query that:
        i. identifies a plurality of items, wherein each of the plurality of items is associated with an item descriptor of the plurality of item descriptors;
        ii. defines a sorting method that is based at least in part upon item clarity scores; and b. cause the user device to show at least the item clarity score for each of the plurality of items, sorted based on the sorting method.

13. The system of claim 1, wherein the item description is associated with an item, and wherein the item is a physical location.

14. The system of claim 13, wherein the item descriptor comprises at least one aspect of sanitation associated with the physical location.

15. A method comprising the steps:
   a. receiving, at a server via an information input interface, an item descriptor for an item;
   b. at the server, determining an item clarity score as a function of the item descriptor and associating the item clarity score with the item descriptor;
   c. receiving an identifier query from a user device;
   d. identifying the item descriptor based upon the identifier query; and
   e. causing a display of the user device to show at least the item clarity score.

16. The method of claim 15, wherein the identifier query is generated from the user device interacting with a machine-readable identifier proximate to the item via an identifier reader of the user device.

17. The method of claim 15, wherein the item is at a physical location, and wherein the identifier query is generated from the user device determining a current geographical location of the user device as being proximate to or within the physical location.

18. A system comprising one or more processors configured to:
   a. provide access to an information input interface and an information output interface;
   b. communicate with a plurality of user devices via the information output interface;
   c. receive a plurality of item descriptors via the information input interface and store the plurality of item descriptors, wherein each of the plurality of item descriptors originates from an item provider user;
   d. for an item descriptor of the plurality of item descriptors,
      i. determine an item clarity score based upon the item descriptor and associate the item clarity score with the item descriptor;
      ii. identify a set of secondary source data that is associated with the item, wherein the set of secondary source data comprises qualitative information that describes the item and that is provided by a user other than the item provider user; and
      iii. determine an extended clarity score based on the item clarity score and the set of secondary source data;
   e. receive an identifier query from a user device of the plurality of user devices and identify the item descriptor based on the identifier query; and
   f. cause the user device to show one or more of the item clarity score and the extended clarity score for the item descriptor associated with the identifier query.

19. The system of claim 18, wherein at least a portion of the set of secondary source data comprises a plurality of user reviews that are received from the plurality of user devices.

20. The system of claim 18, wherein the one or more processors are further configured to cause the user device to show the item clarity score as one or more of:
   a. a numerical indicator;
   b. a text indicator; and
   c. a graphic indicator.

\* \* \* \* \*